US012695832B2

(12) United States Patent
Shinya

(10) Patent No.: US 12,695,832 B2
(45) Date of Patent: Jul. 28, 2026

(54) INSPECTION APPARATUS, CONTROL METHOD OF INSPECTION APPARATUS, AND INSPECTION SYSTEM

(71) Applicant: CANON KABUSHIKI KAISHA, Tokyo (JP)

(72) Inventor: Takeshi Shinya, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 259 days.

(21) Appl. No.: 18/677,252

(22) Filed: May 29, 2024

(65) Prior Publication Data

US 2024/0406318 A1 Dec. 5, 2024

(30) Foreign Application Priority Data

May 30, 2023 (JP) ................................ 2023-088409

(51) Int. Cl.
*H04N 1/00* (2006.01)

(52) U.S. Cl.
CPC ..... *H04N 1/00087* (2013.01); *H04N 1/00005* (2013.01); *H04N 1/00015* (2013.01); *H04N 1/0005* (2013.01); *H04N 1/00068* (2013.01); *H04N 1/00076* (2013.01)

(58) Field of Classification Search
CPC ........... H04N 1/00087; H04N 1/00005; H04N 1/00015; H04N 1/0005; H04N 1/00068; H04N 1/00076
See application file for complete search history.

(56) References Cited

U.S. PATENT DOCUMENTS

| | | | | |
|---|---|---|---|---|
| 12,039,209 B2 * | 7/2024 | Sakamoto | G06F 3/121 | |
| 2020/0051231 A1 * | 2/2020 | Tsukamoto | G06T 7/0002 | |
| 2023/0088442 A1 * | 3/2023 | Suzuki | B41J 2/2132 | 358/1.13 |
| 2023/0142237 A1 * | 5/2023 | Haruta | G06T 7/33 | 382/112 |
| 2023/0297297 A1 * | 9/2023 | Ishikawa | G03G 15/55 | 358/1.15 |
| 2024/0351817 A1 * | 10/2024 | Kitajima | B65H 29/62 | |

FOREIGN PATENT DOCUMENTS

JP 2022007025 A 1/2022

* cited by examiner

*Primary Examiner* — Nicholas Pachol
(74) *Attorney, Agent, or Firm* — Canon U.S.A., Inc. IP Division

(57) ABSTRACT

An inspection apparatus includes a controller having one or more processors which executes instructions stored in one or more memories, the controller being configured to receive an inspection level that is used in an inspection process of images that have been read by a reading apparatus from images formed on sheets conveyed consecutively from an image formation apparatus by execution of a job; and execute the inspection process, wherein the controller is capable of receiving a change in the inspection level during execution of the job, and in a case where the change in the inspection level is received, the controller performs the inspection process of images formed by the job at the inspection level changed after receipt of the change.

15 Claims, 17 Drawing Sheets

*900*

DELIVERY MAY BE DELAYED WITH CURRENT INSPECTION LEVEL.
SOLUTION: CHANGE INSPECTION LEVEL OR DELIVERY TIME

NUMBER OF SHEETS TO BE PRINTED: 1000 SHEETS

| INSPECTION LEVEL | 5 | ~901 |
| DELIVERY TIME | 15 MINUTES LATER | ~902 |
| ESTIMATED COMPLETION TIME | 20 MINUTES LATER | ~903 |

904~ OK

*1006*

| | |
|---|---|
| NUMBER OF SHEETS TO BE PRINTED | 0/1000 |
| INSPECTION LEVEL | 5 ~*1001* |
| DELIVERY TIME | 15 MINUTES LATER ~*1002* |
| ELAPSED TIME | 0 MINUTES ~*1003* |
| ESTIMATED COMPLETION TIME | 10 MINUTES LATER ~*1004* |

*1005*~ OK

| | |
|---|---|
| NUMBER OF SHEETS TO BE PRINTED | 0/1000 |
| INSPECTION LEVEL | 5 |
| CURRENT TIME | 2023/04/20  21:16 |
| DELIVERY TIME | 2023/04/20  21:31 |
| ESTIMATED COMPLETION TIME | 2023/04/20  21:26 |

OK

*1100*

INSPECTION LEVEL

NUMBER OF SHEETS TO BE PRINTED: 1000 SHEETS

| INSPECTION LEVEL AT START | 5 | ~1101 |
| UPPER-LIMIT INSPECTION LEVEL | 7 | ~1102 |
| LOWER-LIMIT INSPECTION LEVEL | 2 | ~1103 |

OK

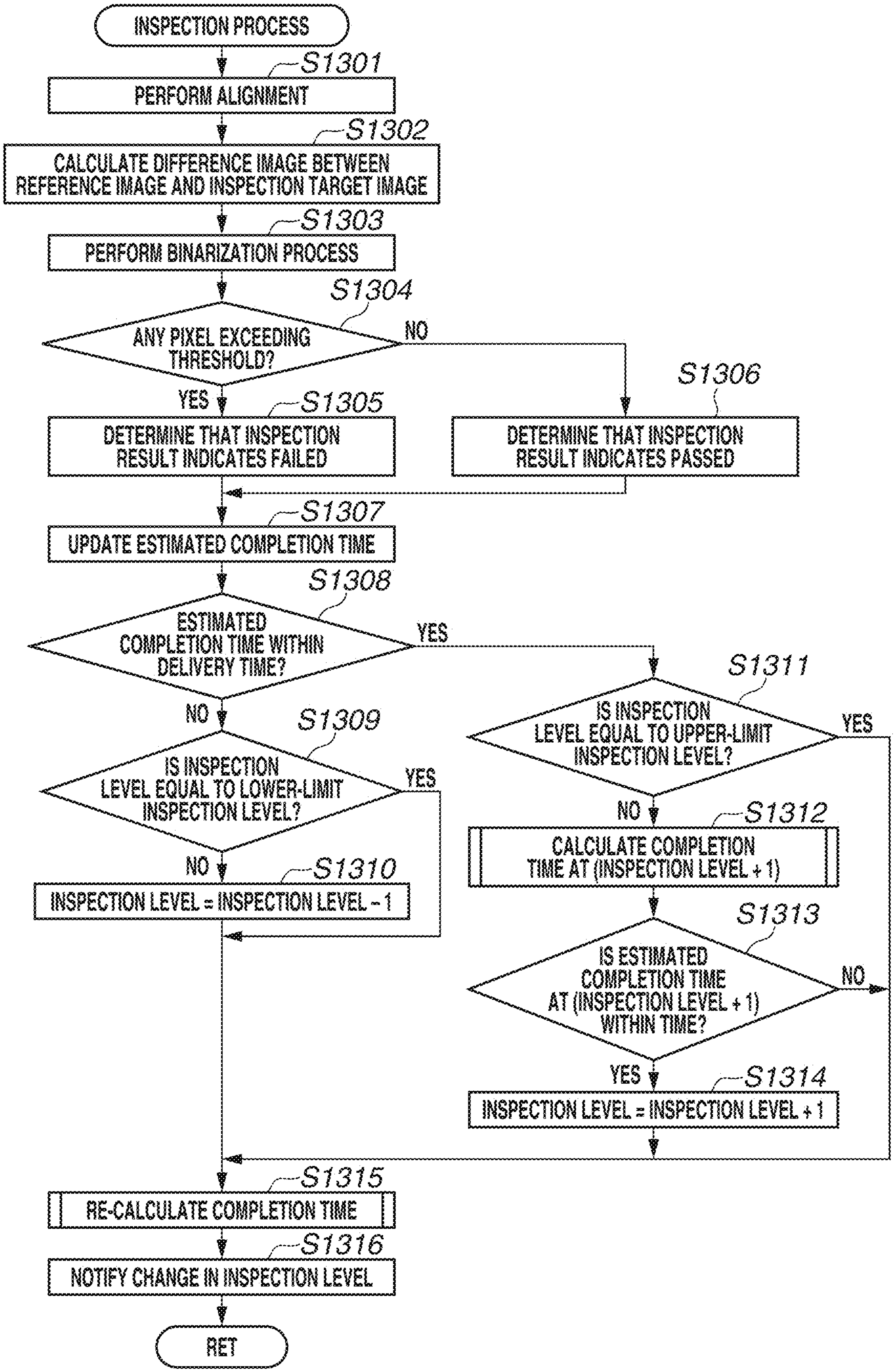

FIG.13

INSPECTION PROCESS

_S1301_
PERFORM ALIGNMENT

_S1302_
CALCULATE DIFFERENCE IMAGE BETWEEN
REFERENCE IMAGE AND INSPECTION TARGET IMAGE

_S1303_
PERFORM BINARIZATION PROCESS

_S1304_
ANY PIXEL EXCEEDING
THRESHOLD? — NO

YES — _S1305_
DETERMINE THAT INSPECTION
RESULT INDICATES FAILED

_S1306_
DETERMINE THAT INSPECTION
RESULT INDICATES PASSED

_S1307_
UPDATE ESTIMATED COMPLETION TIME

_S1308_
ESTIMATED
COMPLETION TIME WITHIN
DELIVERY TIME? — YES

NO — _S1309_
IS INSPECTION
LEVEL EQUAL TO LOWER-LIMIT
INSPECTION LEVEL? — YES

NO — _S1310_
INSPECTION LEVEL = INSPECTION LEVEL − 1

_S1311_
IS INSPECTION
LEVEL EQUAL TO UPPER-LIMIT
INSPECTION LEVEL? — YES

NO — _S1312_
CALCULATE COMPLETION
TIME AT (INSPECTION LEVEL + 1)

_S1313_
IS ESTIMATED
COMPLETION TIME
AT (INSPECTION LEVEL + 1)
WITHIN TIME? — NO

YES — _S1314_
INSPECTION LEVEL = INSPECTION LEVEL + 1

_S1315_
RE-CALCULATE COMPLETION TIME

_S1316_
NOTIFY CHANGE IN INSPECTION LEVEL

RET

INSPECTION APPARATUS, CONTROL METHOD OF INSPECTION APPARATUS, AND INSPECTION SYSTEM

BACKGROUND

Field of the Disclosure

The present disclosure relates to an inspection apparatus, a control method of an inspection apparatus, and an inspection system.

Description of the Related Art

Printed products output from a printing apparatus may become smudged due to a color material, such as ink or toner, adhered to unintended parts of the printing apparatus. There is also a case where printed products may have color loss due to a color material adhered to unintended parts which causes insufficient application of a color material to a part where an image is to be formed and results in color printed lighter than expected. In recent years, to ensure the quality of printed products, inspection systems have been proposed to automatically inspect defects in printed products at a speed at which the printed products are conveyed through a conveyance path.

Some automatic inspection systems use a method with which a defect detection level (for example, a threshold of a color difference or a size at which a defect is detected) is adjustable.

Such inspection systems are generally used at printing companies or the like. At printing companies, the delivery time may be prioritized at a customer's request or the cost may be suppressed with approval of the customer. Japanese Patent Application Laid-Open No. 2022-007025 discusses a technique in which, in order to prioritize the delivery time and the budget, a completion time of a job is calculated at a start of an inspection based on a preset defect detection level, and the calculated completion time is notified to the user.

SUMMARY

According to an aspect of the present disclosure, an inspection apparatus (200) reads images formed on sheets which have been sequentially conveyed from an image formation unit (100) by execution of a job, includes an inspection unit (405) that performs an inspection process on the formed images and a reception unit (509) that receives an inspection level for use in the inspection process by the inspection unit, and receives a change in the inspection level by the reception unit even during execution of the job (S804).

Further features of the present disclosure will become apparent from the following description of exemplary embodiments with reference to the attached drawings.

BRIEF DESCRIPTION OF THE DRAWINGS

FIG. 13 is a flowchart illustrating an inspection process according to one or more aspects of the present disclosure.

DESCRIPTION OF THE EMBODIMENTS

Hereinafter, exemplary embodiments for implementing the present disclosure will be described with reference to the drawings.

Figure 1:
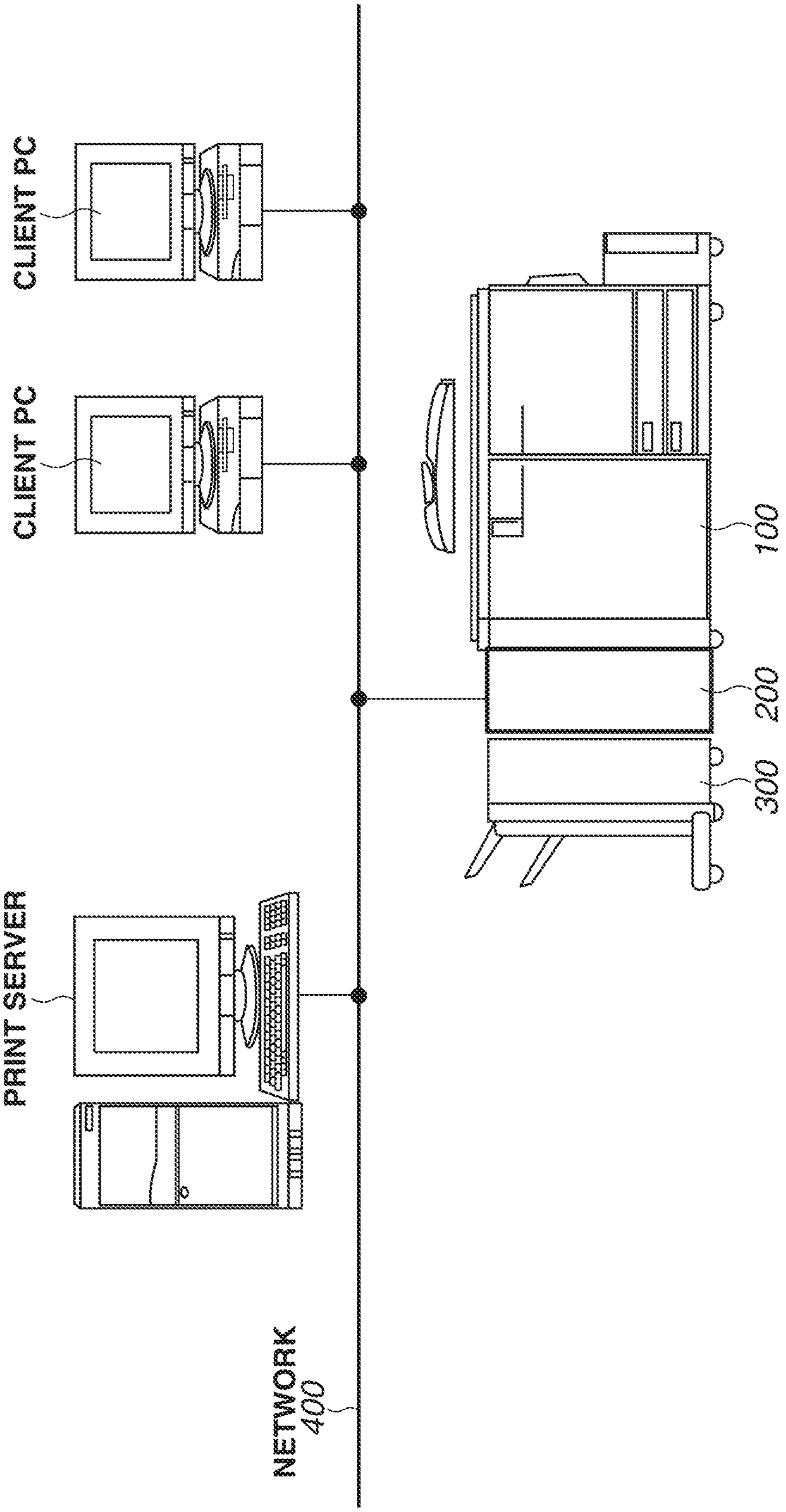
FIG. 1 is a diagram illustrating an example of a system configuration formed of an image formation apparatus according to one or more aspects of the present disclosure.

FIG. 1 is a diagram illustrating a system configuration including an inspection apparatus according to a first exemplary embodiment of the present disclosure.

An image formation apparatus 100 processes various kinds of input data and generates print outputs. An inspection apparatus 200 receives a printed product output from the image formation apparatus 100 and inspects contents of the output. A finisher 300 receives the output sheet inspected by the inspection apparatus 200. The image formation apparatus 100 is connected to an external print server and client personal computers (PCs) via a network 400. The inspection apparatus 200 is connected to the image formation apparatus 100 on a one-to-one basis via a communication cable. The finisher 300 is also connected to the image formation apparatus 100 on a one-to-one basis via another communication cable. The inspection apparatus 200 and the finisher 300 are also connected via yet another communication cable. The present exemplary embodiment is an inline inspection machine that performs all steps of image formation, image inspection, and finishing.

<Configuration of Image Formation Apparatus>

Figure 2:
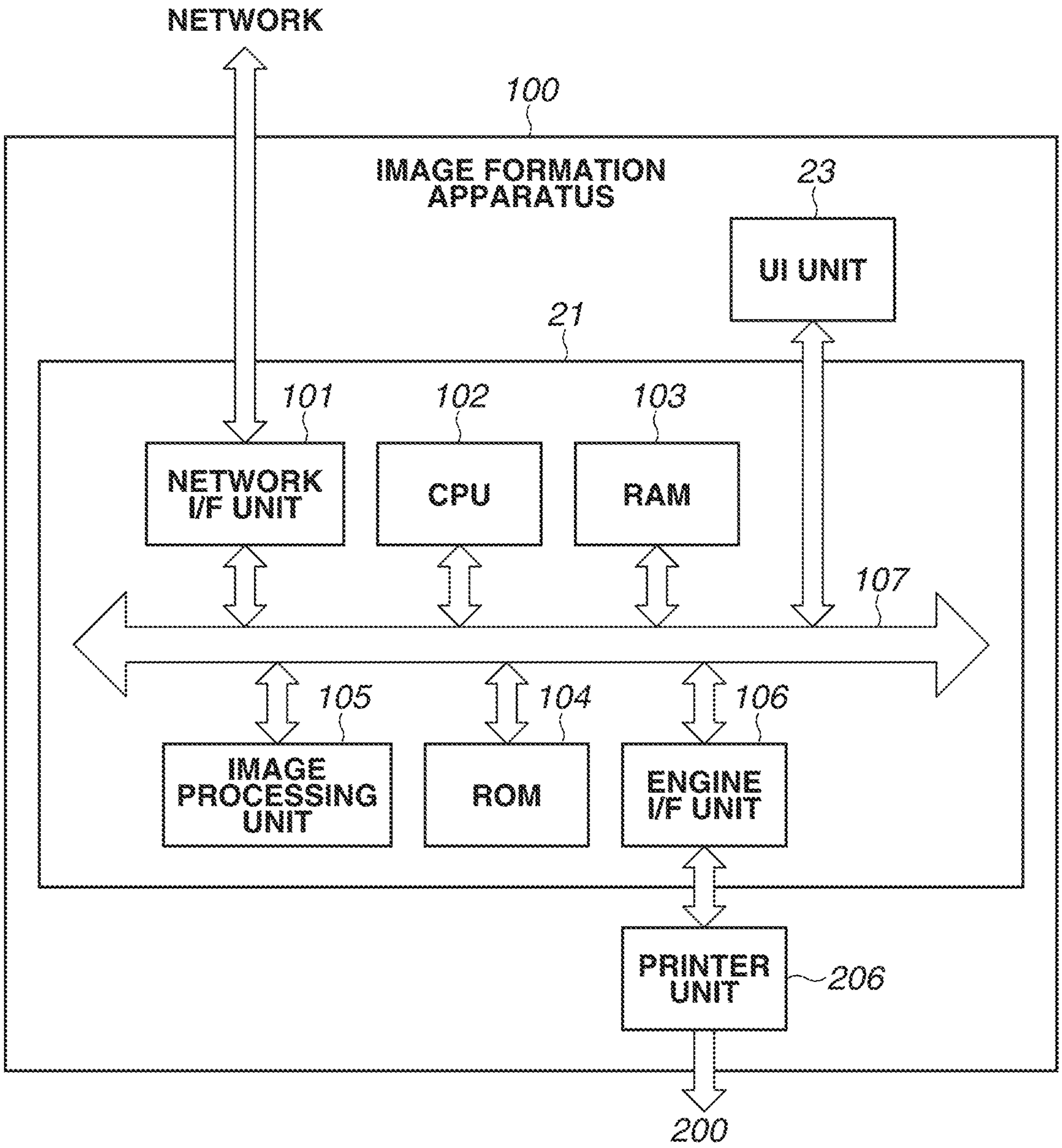
FIG. 2 is a configuration diagram illustrating the image formation apparatus according to one or more aspects of the present disclosure.

FIG. 2 is a configuration diagram of the image formation apparatus 100 according to the present exemplary embodiment.

The image formation apparatus 100 according to the present exemplary embodiment is an example of an image formation apparatus according to the present disclosure, and includes a controller 21, a printer unit 206, and a user interface (UI) unit 23. The UI unit 23 has various switches for use in operations, light-emitting diode indicators, and others.

Images and documents generated by software applications (not illustrated) on the client PCs or the print server on a network are page description language (PDL) data. The PDL data is transmitted to the image formation apparatus 100 via the network 400 (for example, a local area network). In the image formation apparatus 100, the controller 21 receives the transmitted PDL data.

The controller 21 is connected to the printer unit 206, receives the PDL data from the client PCs or the print server, converts the PDL data into print data that can be processed by the printer unit 206, and outputs the print data to the printer unit 206.

The printer unit 206 prints images based on the print data output from the controller 21. While, in the present exemplary embodiment, the printer unit 206 is an electrophotographic type printing engine, the printing method is not limited to the electrophotographic type and may be the ink-jet (IJ) type.

The UI unit 23 is used and operated by the user to select various functions or issue operational instructions. The UI unit 23 includes a liquid crystal display with a touch panel on the front surface, a keyboard on which various keys, such as a start key, a stop key, and a numeric keypad, are arranged, and others.

Next, details of the controller 21 will be described. The controller 21 has a network interface (I/F) unit 101, a central processing unit (CPU) 102, a random access memory (RAM) 103, a read only memory (ROM) 104, an image processing unit 105, an engine I/F unit 106, and an internal bus 107.

The network I/F unit 101 is an interface through which PDL data transmitted from the client PCs or the print server is received.

The CPU 102 uses programs and data stored in the RAM 103 or the ROM 104 to control an overall operation of the image formation apparatus 100, and executes processes described below by the controller 21.

The RAM 103 includes a work area that is used by the CPU 102 to execute various processes.

The ROM 104 stores the programs and data, with which the CPU 102 executes the various processes described below, setting data of the controller 21, and others.

The image processing unit 105 performs print image processing on the PDL data received through the network I/F unit 101 in accordance with the settings acquired from the CPU 102, and generates print data that can be processed by the printer unit 206. The image processing unit 105 rasterizes the received PDL data to generate image data having a plurality of color components per pixel.

The plurality of color components refers to color components that are independent in the color space of red, green, and blue (RGB) or the like. The image data has an 8-bit (256 gradations) per color component in each pixel.

That is, the image data is multiple-value bitmap data that includes multiple-value pixels. At the rasterization described above, the image processing unit 105 generates attribute data indicating an attribute of each pixel in the image data, in addition to the image data. The attribute data indicates to what type of object the pixel belongs, and has values that indicate the type of an object, such as character, line, graphics, image, and background. The image processing unit 105 uses the generated image data and attribute data to perform image processing, such as color conversion from the RGB color space to the cyan, magenta, yellow, and black (CMYK) color space and screen processing, to generate print data.

The engine I/F unit 106 is an interface through which the print data generated by the image processing unit 105 is transmitted to the printer unit 206.

The internal bus 107 is a system bus that connects the above-described units.

Figure 3:
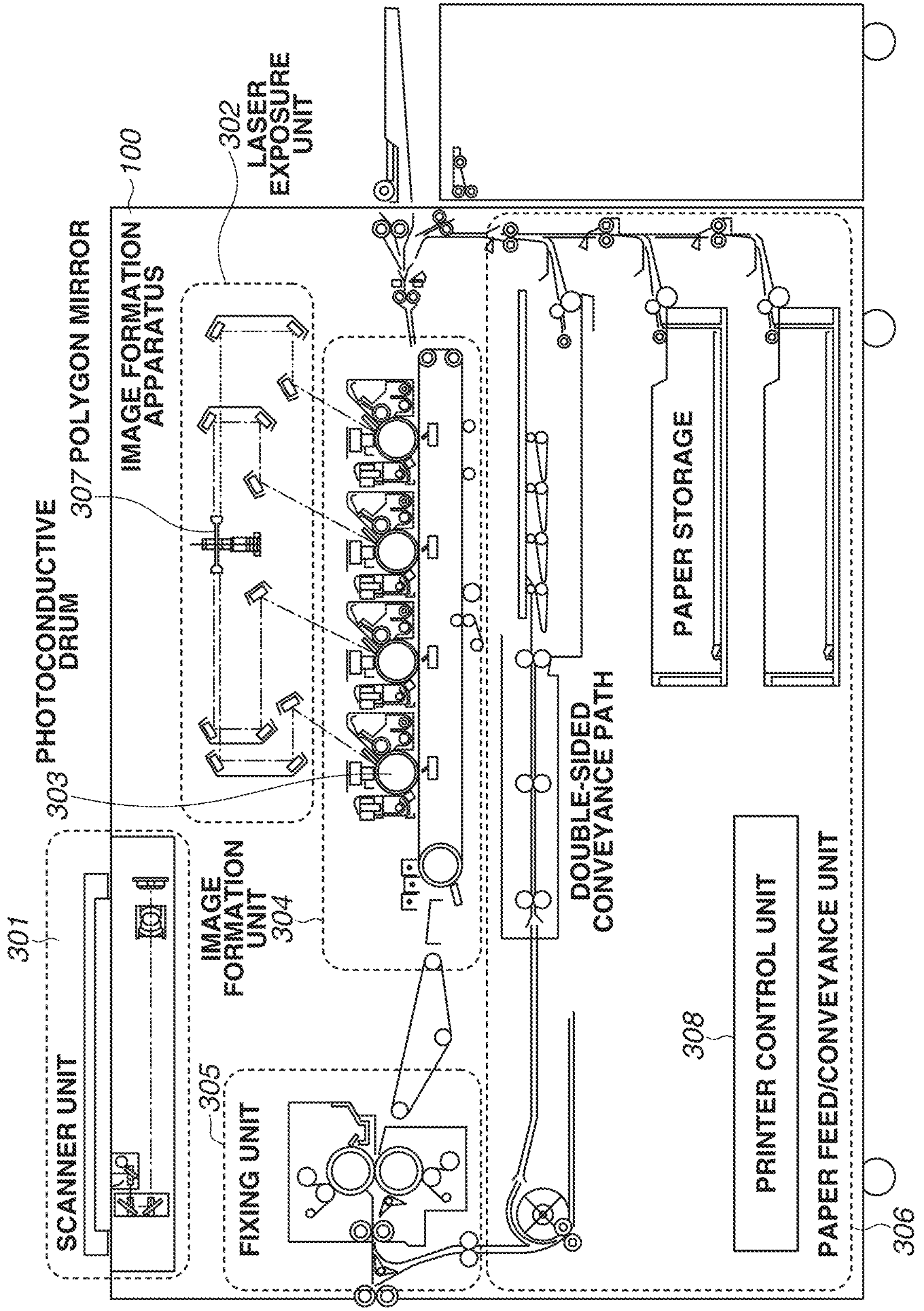
FIG. 3 is a configuration diagram illustrating a printer unit in the image formation apparatus.

FIG. 3 is a diagram illustrating a configuration of the printer unit 206 in the image formation apparatus 100.

The image formation apparatus 100 includes a scanner unit 301, a laser exposure unit 302, photoconductive drums 303, an image formation unit 304, a fixing unit 305, a paper feed/conveyance unit 306, and a printer control unit 308 that controls the aforementioned units.

The scanner unit 301 illuminates a document placed on a platen glass and optically reads the document image, and converts the read image into an electrical signal to generate image data.

The laser exposure unit 302 emits a beam of laser light or the like modulated in accordance with the image data to a rotary polygon mirror 307 that rotates at a constant angular speed and irradiates the photoconductive drums 303 with the reflection scanning light.

The image formation unit 304 rotationally drives the photoconductive drums 303, electrically charges the photoconductive drums 303 by chargers, develops latent images formed on the photoconductive drums 303 by the laser exposure unit 302 with toner. The image formation unit 304 includes four electrophotographic process development units (development stations) in a row, each of which transfers the toner image onto a recording sheet (paper sheet) and collects a residual toner that has been slightly left on the photoconductive drums 303 in the transferring.

The four development units arranged in a row in order of cyan (C), magenta (M), yellow (Y), and black (K), perform image formation consecutively in order of magenta, yellow, and black after a lapse of a predetermined time from a start of the image formation in the cyan station.

The fixing unit 305 includes a combination of rollers and belts, and contains a heat source, such as a halogen heater, to melt and fix a toner on a paper sheet onto which toner images have been transferred by the image formation unit 304. In a case of printing on a thick paper sheet, since the paper is thick and has low heat conductivity, a speed of the paper sheet passing through the fixing unit 305 is set to half of the normal speed. Due to this, in the case of printing on the thick paper sheet, the paper conveyance speed in the units other than the fixing unit 305 is also reduced to one-half, and consequently, the printing speed of the image formation apparatus 100 is reduced to one-half.

The paper feed/conveyance unit 306 has one or more paper storages typified by a paper cassette or a paper deck, separates one paper sheet from a plurality of paper sheets stored in the paper storage in response to an instruction from the printer control unit 308, and conveys the separated paper sheet to the image formation unit 304 and the fixing unit 305.

The paper sheets are conveyed consecutively and toner images of the above-described colors are transferred onto the paper sheets by the development stations described above, and finally, a full-color image is formed on the paper sheets. In a case of forming an image on both sides of a paper sheet, the paper feed/conveyance unit 306 performs control to cause the paper sheet having passed through the fixing unit 305 to pass through a double-sided conveyance path that conveys the paper sheet to the image formation unit 304.

The printer control unit 308 communicates the controller 21 that controls an overall operation of the image formation apparatus 100, and controls the operation in response to instructions from the controller 21. The printer control unit 308 issues instructions to the scanner unit 301, the laser exposure unit 302, the image formation unit 304, and the paper feed/conveyance unit 306 such that these units smoothly operate in harmonization while managing the states of these units.

<Internal Configuration of Inspection Apparatus>

Figure 4A:
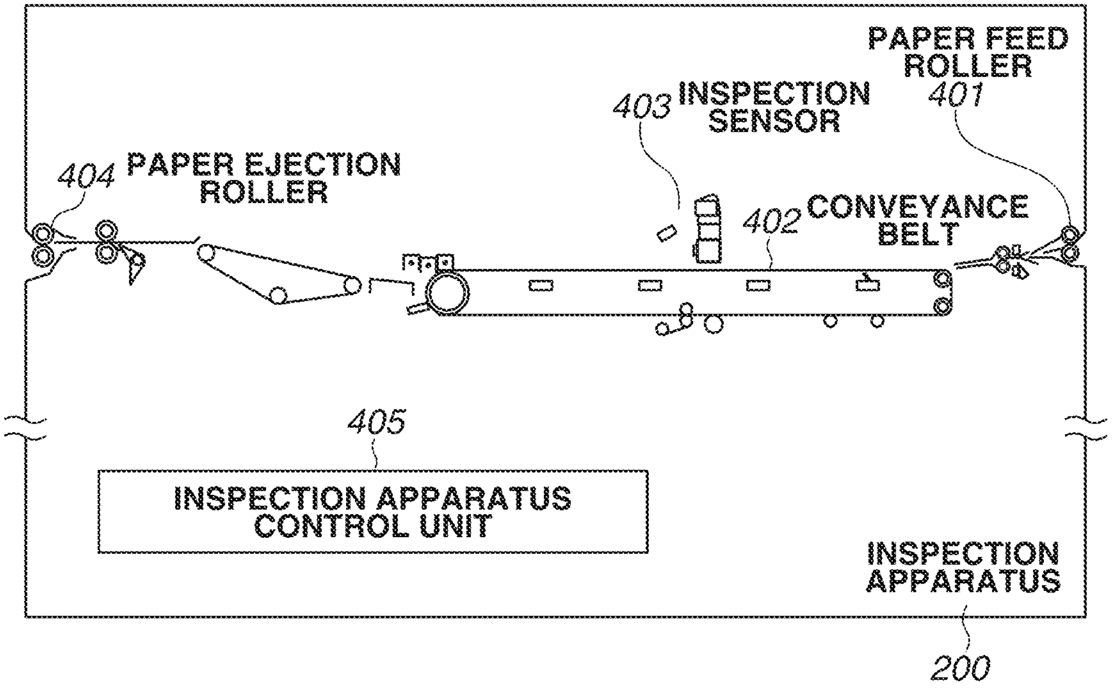
FIG. 4A is a configuration diagram illustrating an inspection apparatus.

FIG. 4A is a schematic view illustrating an internal configuration of the inspection apparatus 200. A paper sheet (printed product) printed and output from the image formation apparatus 100 is conveyed by a paper feed roller 401 into the inspection apparatus 200. After that, the printed product is conveyed by a conveyance belt 402 and is read by an inspection sensor 403 disposed above the conveyance belt 402. An inspection apparatus control unit 405 uses the image (scanned image) read by the inspection sensor 403 to perform an inspection process. The inspection apparatus control unit 405 also controls an overall operation of the inspection apparatus 200. The inspection result is sent to the finisher 300. After the inspection, the printed product is output by a paper ejection roller 404. While not illustrated in the drawing, the inspection sensor 403 may also be configured to read an image from under the conveyance belt 402 to support a job of double-sided printing. While, in the present exemplary embodiment, the inspection apparatus control unit 405 is configured to control the overall operation of the inspection apparatus 200 and perform the inspection process, the present disclosure is not limited to this configuration. For example, processes that are performed by an inspection processing unit 507 described below may be performed by an information processing apparatus (inspection PC) or the like that communicates with the inspection apparatus 200.

Figure 4B:
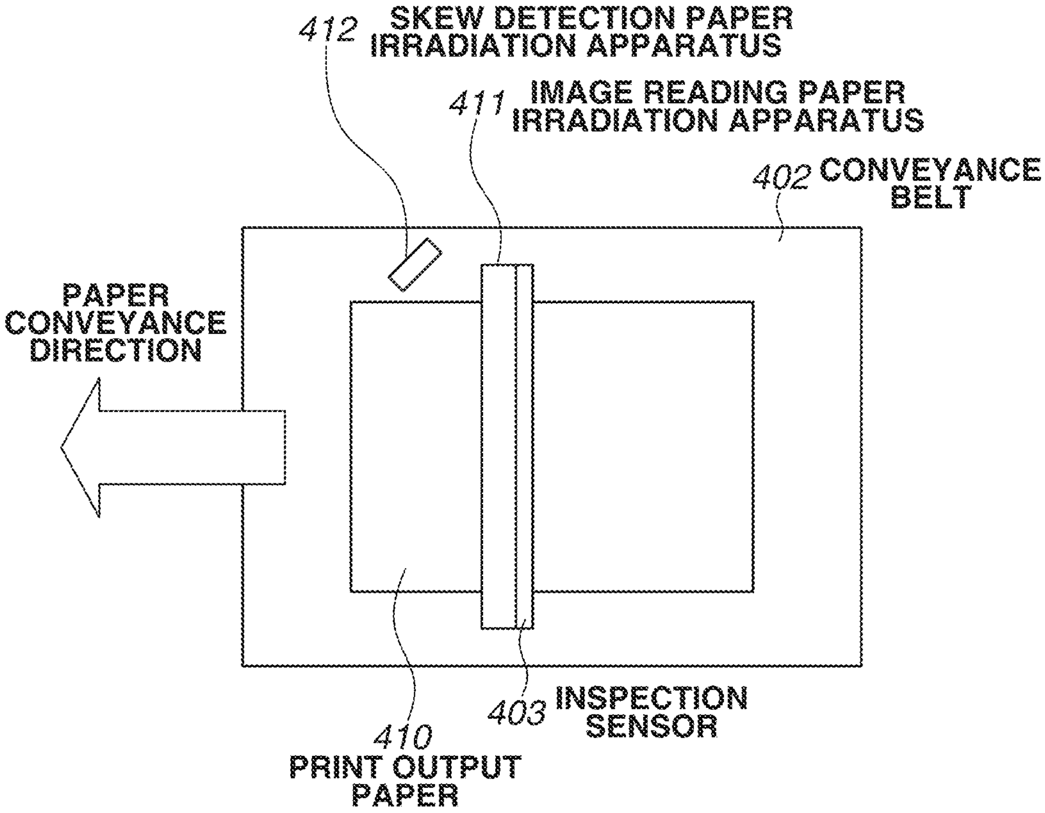
FIG. 4B is a schematic diagram illustrating a state of the inspection apparatus in reading.

FIG. 4B is a diagram illustrating an example of a top view of the conveyance belt 402, where the inspection sensor 403 serves as a line sensor that reads line by line the overall image on print output paper (printed product) 410 conveyed as illustrated. An image reading paper irradiation apparatus for 411 is an apparatus that irradiates the printed product 410 with light at the time of reading by the inspection sensor 403. A skew detection paper irradiation apparatus 412 is an apparatus for reading the printed product to determine whether the printed product is skewed with respect to the paper conveyance direction when being conveyed through the conveyance belt 402. The skew detection paper irradiation apparatus 412 irradiates the conveyed paper sheet with light in a diagonal direction to read a shadow image of an end portion of the paper sheet and detects whether the paper sheet is skewed. While, in the present exemplary embodiment, the shadow image of the end portion of the paper sheet is read by the inspection sensor 403, a read sensor other than the inspection sensor 403 may be used.

Figure 5:
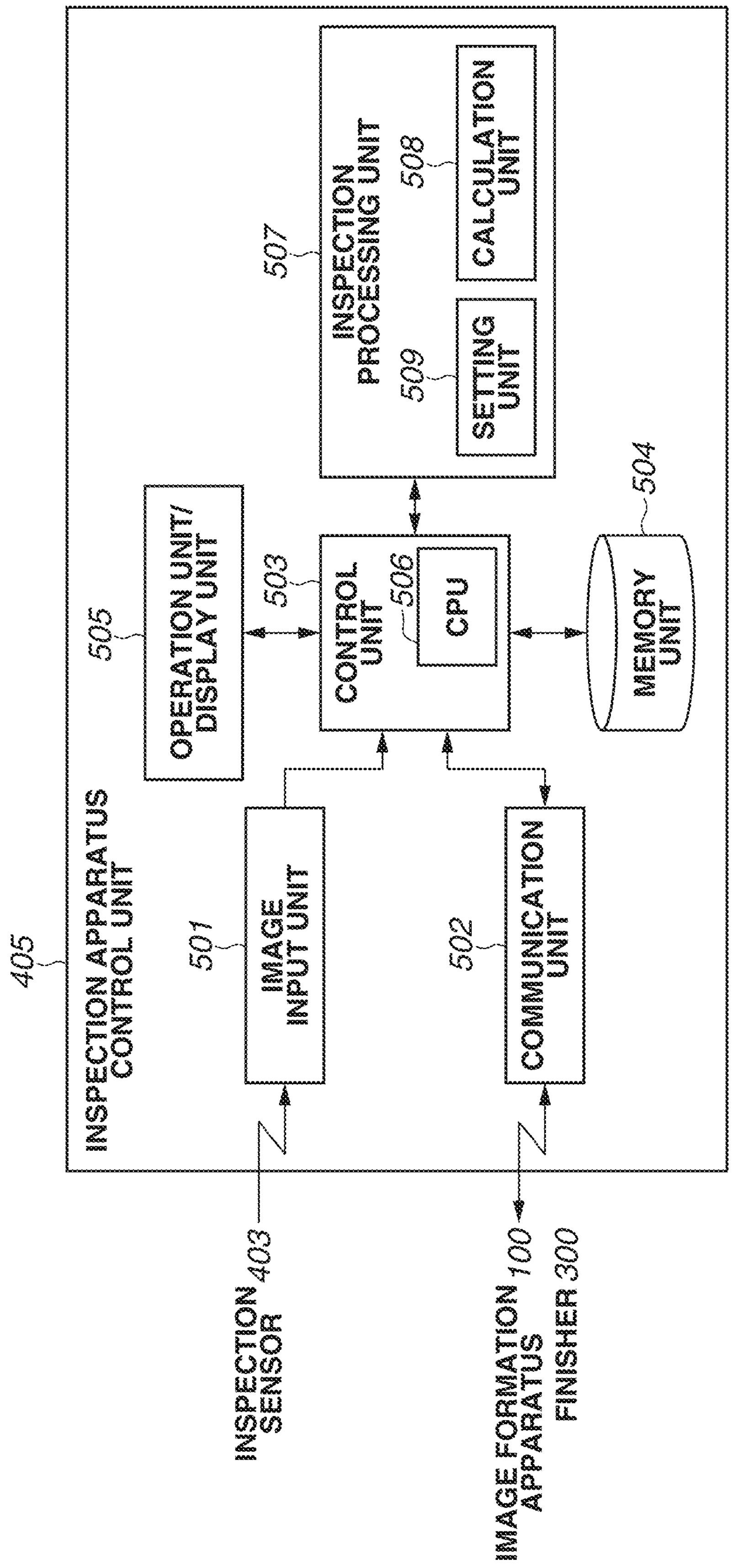
FIG. 5 is an internal configuration diagram illustrating an inspection apparatus control unit.

FIG. 5 is a block diagram illustrating a functional configuration of the inspection apparatus control unit 405 of the inspection apparatus 200 according to the present exemplary embodiment.

An entire operation of the inspection apparatus control unit 405 is controlled by a control unit 503. The control unit 503 has a CPU 506 that executes programs developed in a memory unit 504 to execute various processes. An image input unit 501 receives scanned image data to be inspected (hereinafter, scanned image or read image) that has been read by the inspection sensor 403. The CPU 506 stores the received scanned image in the memory unit 504. A communication unit 502 communicates with the controller 21 of the image formation apparatus 100. This communication refers to transmission and reception of information on the paper size and the number of papers corresponding to the scanned image (hereinafter, printing information). The communication may include reception of the image data used in printing and the printing information corresponding to the image data (hereinafter, raster image processor (RIP) image). The CPU 506 stores the scanned image or the RIP image as a reference image of inspection (hereinafter, reference image or correct-answer image) in the memory unit 504.

The inspection processing unit 507 performs an inspection process on the reference image and the read image stored in the memory unit 504. The inspection process is performed in accordance with an inspection parameter preset by the user on the reference image displayed on an operation unit/display unit 505. In the present exemplary embodiment, the inspection level is set as the inspection parameter. The inspection level can be set, for example, from 1 to 5. With an increase in the value of the inspection level, a color difference in a detected smudge to be determined as a defect is decreased, whereby a stricter inspection can be performed. With a decrease in the value of the inspection level, a color difference in a detected smudge to be determined as a defect is increased, and thus the allowable limit of smudges increases. The value that is set may be any value other than the inspection level, and a color difference itself may be set, for example. The inspection level is not limited to be set with respect to a color difference and may be set with respect to an inspection item. Examples of the inspection item that is used in the inspection include an item with which, in a case where a printed position of a read image has been determined as being misaligned from a reference image in comparison between the reference image and the read image, pass or failure of the inspection is determined based on a preset misalignment amount.

Examples of general inspection items of the inspection item other than the above-described one are misregistration, color difference, a fold in paper, the number of defects, a type of a defect, and a smudge in paper. One or more of them are used to perform the inspection process.

The inspection processing unit 507 has a calculation unit 508 and a setting unit 509, and performs estimation calculation of a completion time by using a delivery time and printing information obtained via the operation unit/display unit 505. A specific estimation calculation method of a completion time will be described below.

A completion time may not be estimated by calculation but may be estimated by past statistical values stored in advance in the memory unit 504 or by machine learning.

The inspection processing unit 507 displays a warning on the operation unit/display unit 505 or receives an instruction for a change in the inspection level in accordance with the estimated completion time.

Inspection control information that is exchanged between the inspection apparatus 200 and the finisher 300 includes inspection result information and control information for use in control of operations of the finisher 300 in accordance with the inspection result information.

Operations of the inspection processing unit 507 are controlled by the CPU 506 of the control unit 503. The control unit 503 sequentially performs the inspection process on pairs of a reading image and a reference image corresponding to each other by using the inspection processing unit 507. The details of the inspection processing unit 507 will be described below.

After completion of the inspection process, a determination result of the inspection is sent to the control unit 503 and displayed on the operation unit/display unit 505. In a case where the determination result indicates a defect, the control unit 503 changes operations of the image formation apparatus 100 and the finisher 300 via the communication unit 502, by using a method specified in advance by the user via the operation unit/display unit 505. For example, the control unit 503 stops the image formation process that is performed by the image formation apparatus 100, and changes a tray to which the sheet paper is to be discharged in the finisher 300 to an escape tray.

<Outline of Processing by Inspection Processing Unit>

Next, an outline of processing that is performed by the inspection processing unit 507 will be described with reference to the flowchart illustrated in FIG. 6.

Figure 6:
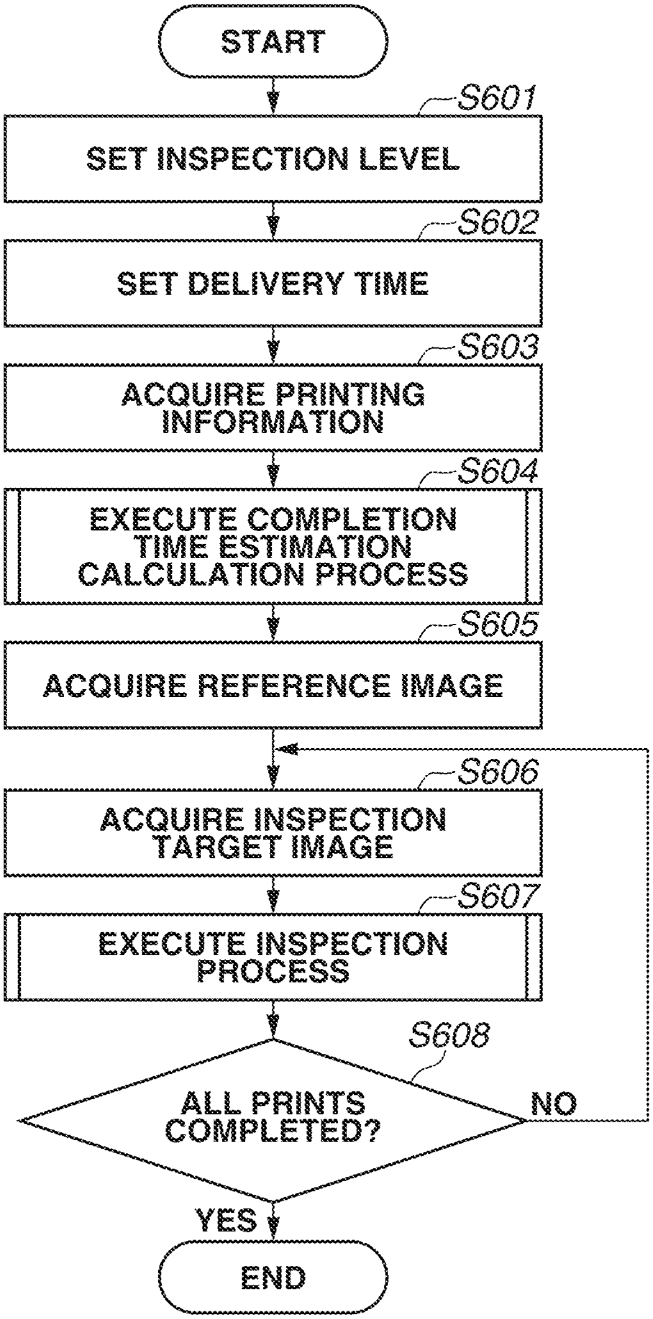
FIG. 6 is a flowchart illustrating control that is performed by the inspection apparatus.

FIG. 6 is a flowchart illustrating the inspection process that is performed by the inspection apparatus 200 according to the first exemplary embodiment. The processing illustrated in the flowchart is implemented by the CPU 506 of the control unit 503 executing a program stored in the memory unit 504.

First, in step S601, the inspection processing unit 507 sets an inspection parameter, such as the inspection level, by the setting unit 509, based on an operation of the user received via the operation unit/display unit 505. The inspection level may be set while the reference image acquired in step S605 described below is displayed on the operation unit/display unit 505.

Next, in step S602, the inspection processing unit 507 sets a delivery time by the setting unit 509 based on an operation of the user received via the operation unit/display unit 505. The delivery time may be set in job properties displayed on the client PC by the user, and the inspection processing unit 507 may receive the delivery time as part of the printing information in step S603. The setting of the delivery time is not limited, and the delivery time may be set as the completion time or as the amount of time to be required for the completion.

In step S603, the inspection processing unit 507 acquires the printing information from the image formation apparatus 100 by the setting unit 509.

In step S604, the inspection processing unit 507 calculates a completion time by the calculation unit 508 from the inspection level and the printing information (paper size and the number of prints) (described below in detail).

In step S605, the inspection processing unit 507 acquires the reference image stored in the memory unit 504.

In step S606, the inspection processing unit 507 receives the read image acquired by the inspection sensor 403. Alternatively, the inspection processing unit 507 acquires the read image stored in the memory unit 504.

In step S607, the inspection processing unit 507 executes the inspection process.

In step S608, the inspection processing unit 507 determines whether all the prints have been completed. In a case where all the prints have been completed (YES in step S608), the processing of the flowchart is ended. In a case where all the prints have not been completed (NO in step S608), the processing returns to step S606. In step S606, the next image to be inspected is read.

<Completion Time Estimation Calculation Process>

Figure 7:
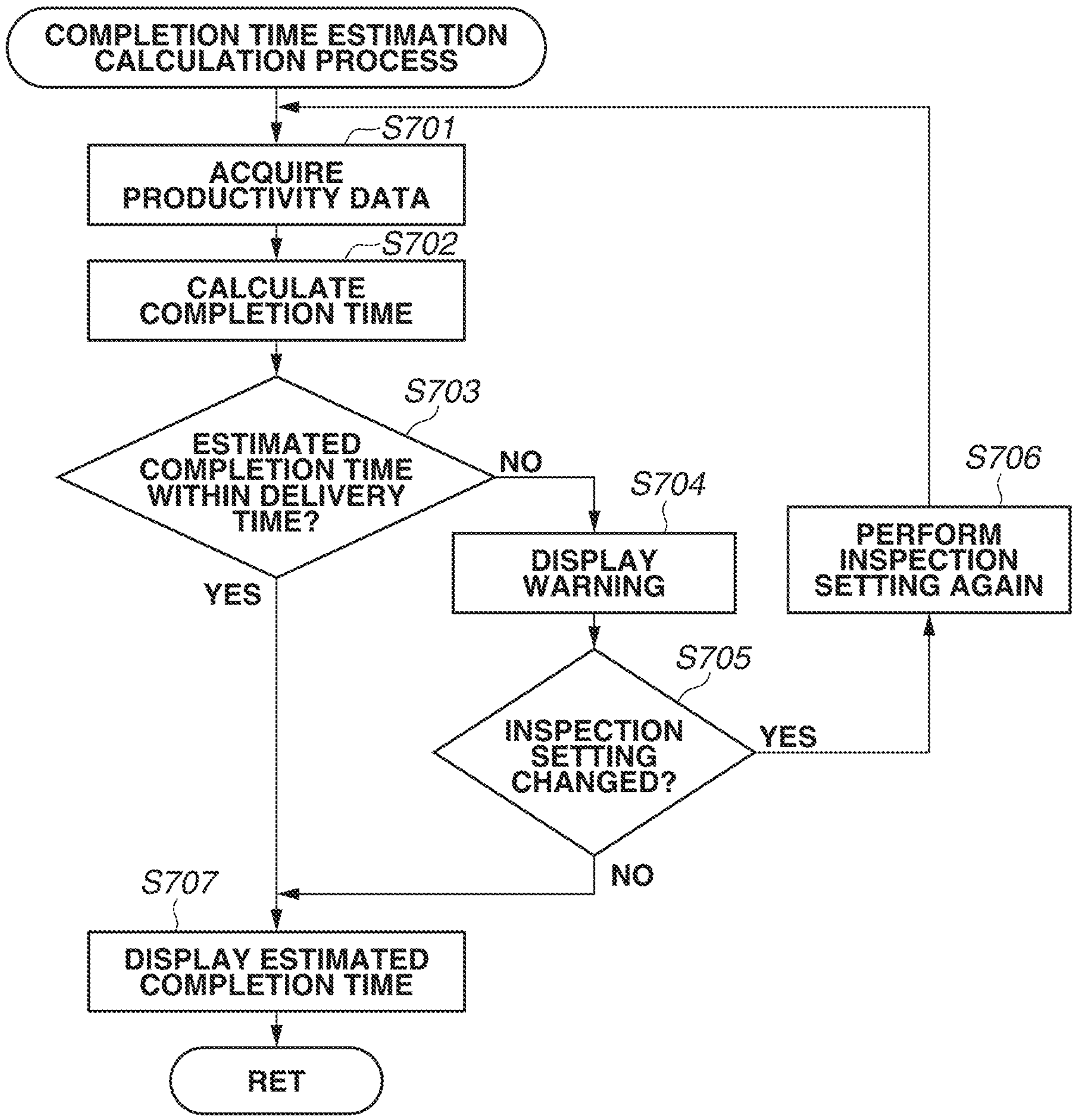
FIG. 7 is a flowchart illustrating a completion time estimation calculation process according to one or more aspects of the present disclosure.

The completion time estimation calculation process that is performed by the calculation unit 508 in step S604 will be described with reference to the flowchart illustrated in FIG. 7. In the completion time estimation calculation process, the inspection level, the delivery time, and the printing information acquired by the setting unit 509 are used.

In step S701, the inspection processing unit 507 acquires productivity data from a relationship between the inspection level and the paper size, from the memory unit 504. For example, the productivity data is stored in the memory unit 504 in the form as shown in Table 1. In a case where the paper size is A4 and the inspection level is "5", the productivity data is 50 pages/min. This productivity data represents the number of pages of printed products that is to be determined as OK (inspection passed) in the inspection per minute. This data is stored in advance in the memory unit 504.

In Table 1, the productivity data is different between a case at the inspection level "4" and a case at the inspection level "5" even with the same paper size. The value of the productivity data at the inspection level "5" is set smaller because, at the inspection level "5", even slight smudges are likely to be determined as defects in the inspection and the number of printed pages that is to be determined to be OK is decreased. Even at the same inspection level "5", with the difference in the paper size, the productivity data is set different. This is because the number of prints per minute (ppm) is different due to the difference in the paper size. Because the number of prints capable of being produced is increased with a smaller paper size, the value of ppm is increased. With an increase in the number of printable pages per minute, the number of pages to be printed per minute is also increased.

TABLE 1

Productivity Data Table

| Paper Size | Inspection Level | Productivity Data (Pages/min) |
|---|---|---|
| A3 | 5 | 25 |
| A4 | 5 | 50 |
| A4 | 4 | 70 |
| . . . | . . . | . . . |

In step S702, the inspection processing unit 507 performs estimation calculation of the completion time from the productivity data and the number of printed products. For example, in a case of print data of 1000 pages with A4 size, 1000 (pages)/50 (pages/min)=20 minutes is obtained from the productivity data.

Figure 9:
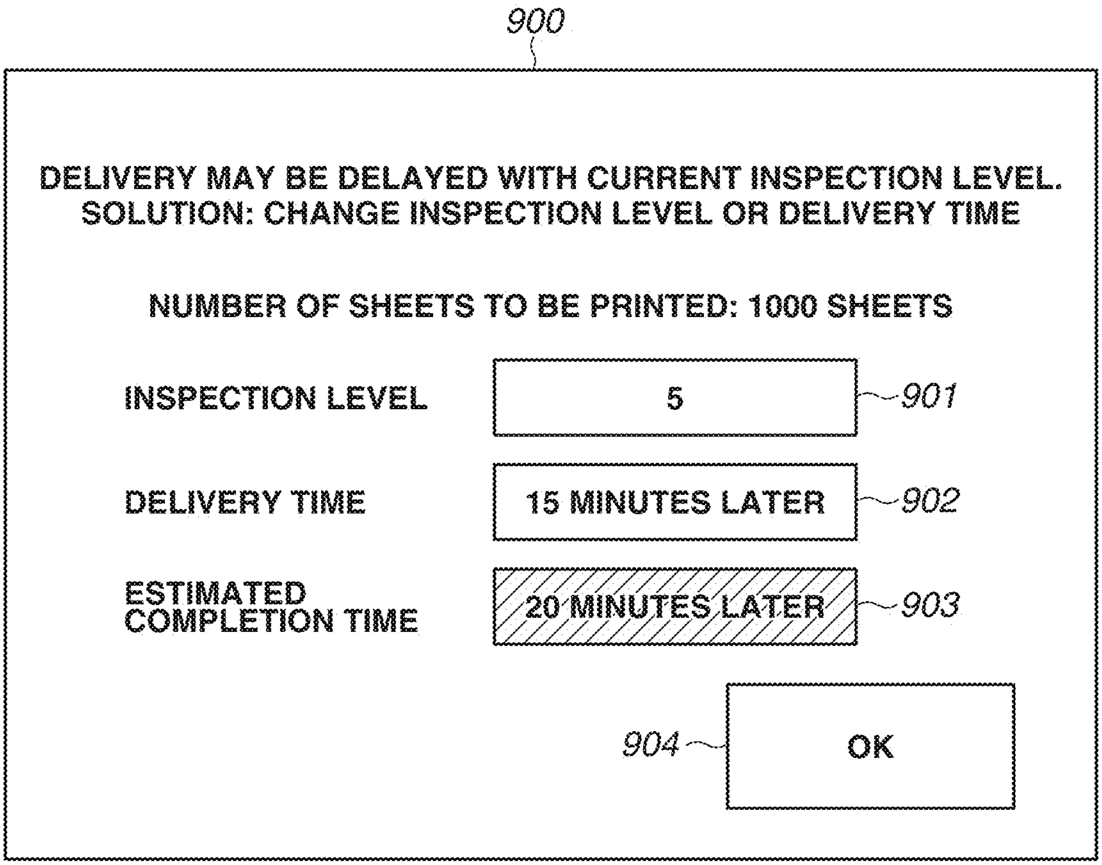
FIG. 9 is a diagram illustrating an example of a warning display screen that displays a result of the completion time estimation calculation and prompts a user to change an inspection level.

In step S703, the inspection processing unit 507 checks the estimated completion time against the delivery time to determine whether the estimated completion time is within the delivery time. In a case where the estimated completion time is not within the delivery time (NO in step S703), the processing proceeds to step S704. In step S704, a warning display UI 900 as illustrated in FIG. 9 is displayed on the operation unit/display unit 505. Via the warning display UI 900, the inspection level in a text box 901 and the delivery time in a text box 902 can be changed. The input method may be with numbers or may be with selection from a pull-down list. The user can change the inspection level and the delivery time while checking the estimated completion time displayed on a display field 903.

When the user has completed an operation on the text box 901 or the text box 902 and presses a button 904 to change the inspection level or the delivery time (hereinafter, inspection setting), the processing proceeds to step S705.

In step S705, the inspection processing unit 507 determines whether any inspection setting has been changed. In a case where any inspection setting has been changed (YES in step S705), the processing proceeds to step S706. In step S706, the inspection processing unit 507 performs the inspection setting again based on the information on the value in the text box 901 or 902 which has been changed by the user. In a case where no inspection setting has been changed (NO in step S705), this means that the user has approved the settings, and thus the inspection processing unit 507 determines that the processing proceeds to the inspection process with the inspection settings unchanged. The processing proceeds to step S707.

In step S706, the inspection processing unit 507 performs the setting of the inspection level again by the setting unit 509, and the processing returns to step S701. In step S701, the inspection processing unit 507 performs estimation calculation of the completion time in the above-described way.

A timing of the estimation calculation of the completion time is not limited to the above-described one. For example, the estimation calculation of the completion time may be performed at a timing when the value in the text box 901 or 902 is changed. The timing can be at any timing as long as the estimated completion time is notified to the user in an easily understandable manner.

Figure 10A:
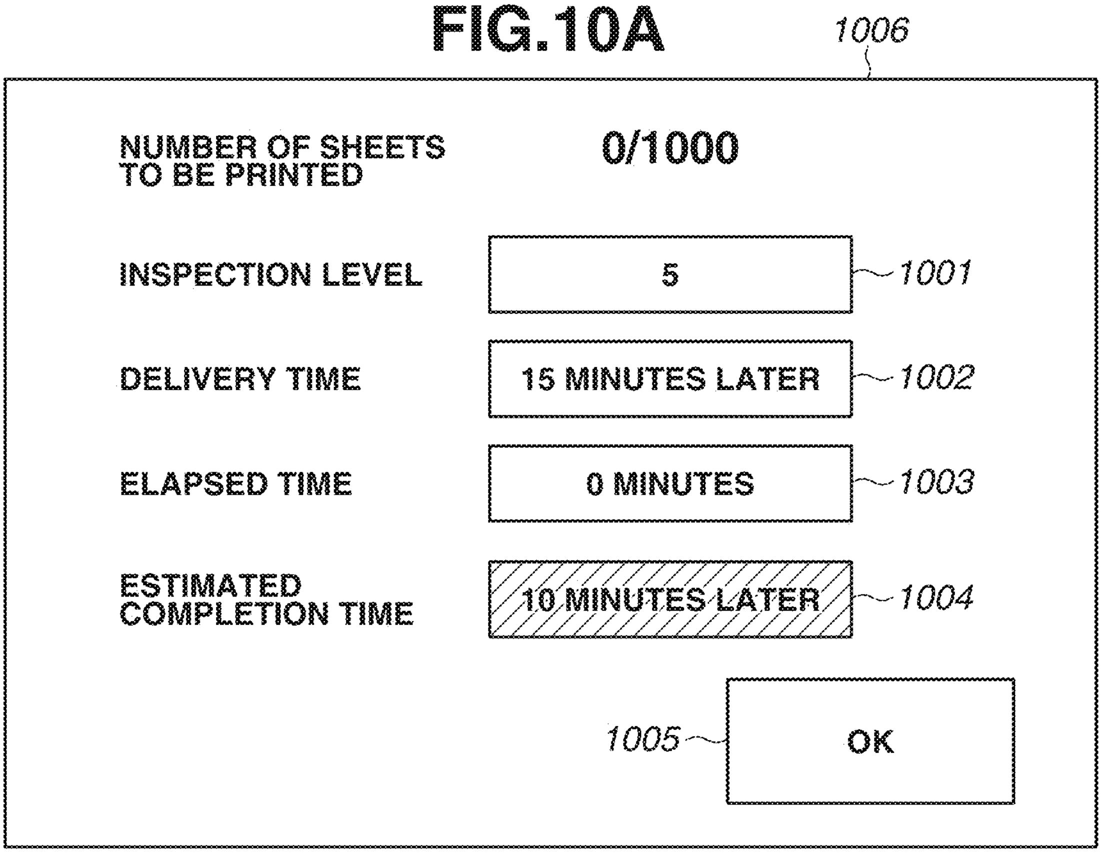
FIG. 10A is a diagram illustrating an example of a user interface (UI) screen which is displayed during the inspection process according to one or more aspects of the present disclosure.
Figure 10B:
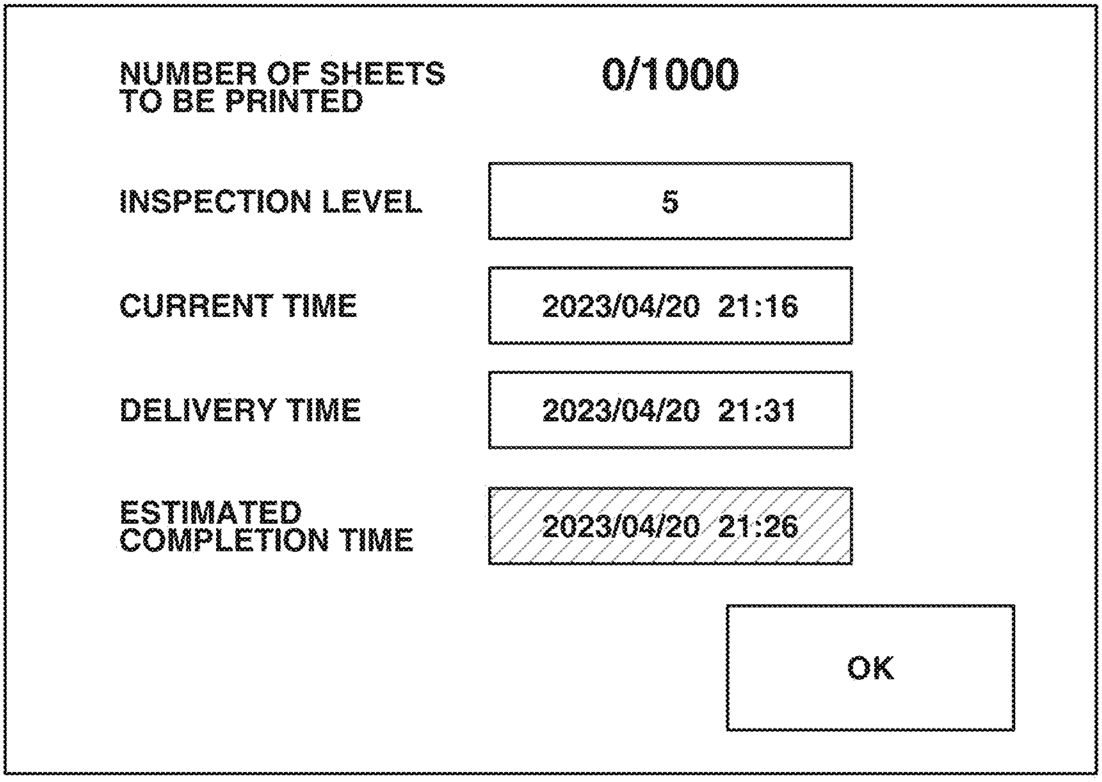
FIG. 10B is a diagram illustrating another example of a UI screen which is displayed during an inspection process.

In a case where the inspection processing unit 507 determines in step S703 that the estimated completion time is within the delivery time (YES in step S703) or determines in step S705 that the user has not changed any inspection setting (NO in step S705), the processing proceeds to step S707. In step S707, the estimated completion time is displayed on the operation unit/display unit 505. The estimated completion time is displayed and notified to the user as illustrated in FIG. 10A. Alternatively, the delivery time and the estimated completion time may be converted into a time format, as illustrated in FIG. 10B, by adding the estimated completion time to the current time and displaying in a time format or a date and time format. Both the estimated completion time and a time to be taken may be displayed and notified to the user.

<Inspection Process>

Figure 8:
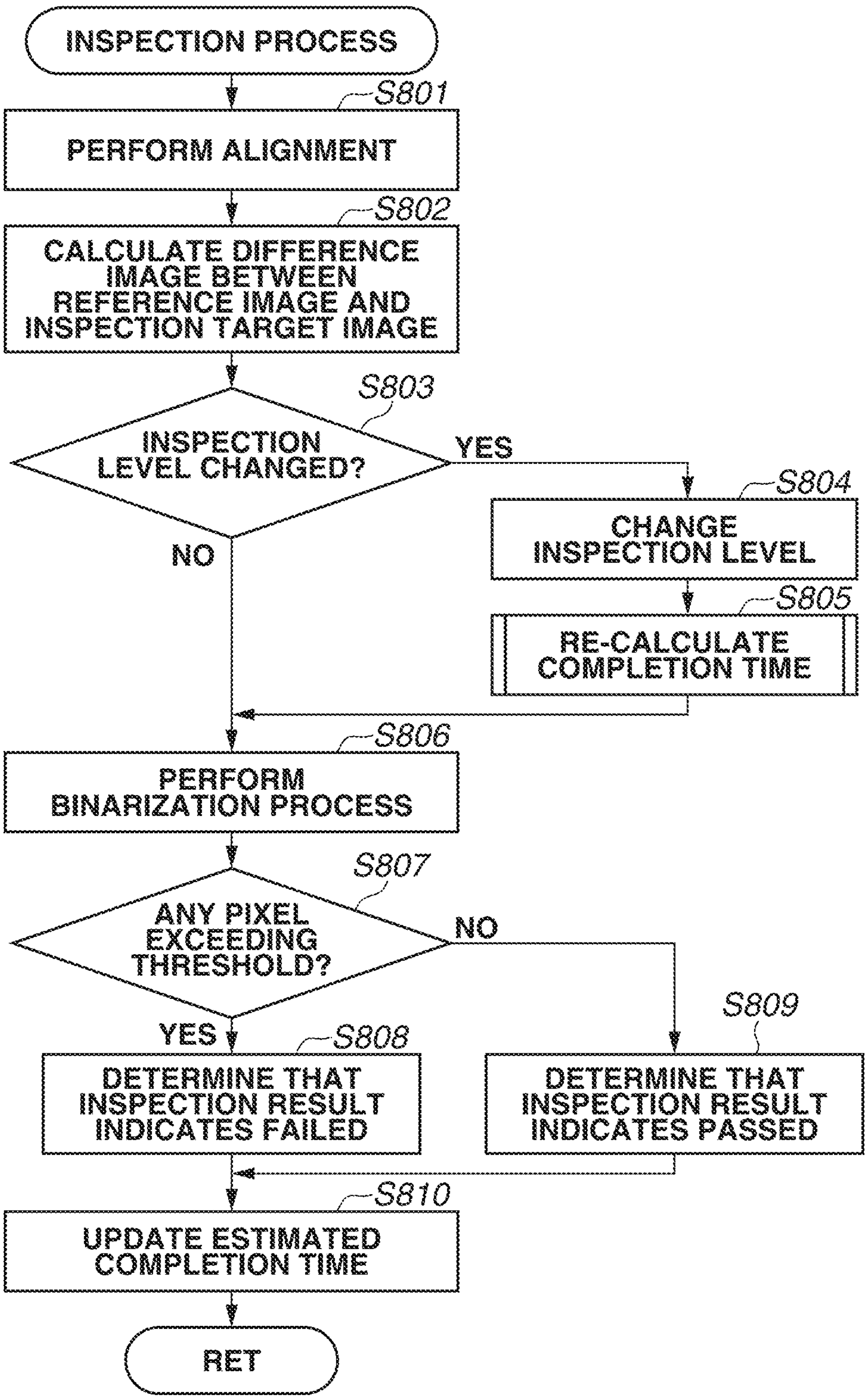
FIG. 8 is a flowchart illustrating an inspection process according to one or more aspects of the present disclosure.

The inspection process in step S607 will be described with reference to the flowchart in FIG. 8. The processing of the flowchart is started when the read image is acquired in step S606.

In step S801, the inspection processing unit 507 uses a general alignment processing method to align the reference image and the inspection target image.

In step S802, the inspection processing unit 507 calculates a difference image between the reference image and the inspection target image.

In step S803, the inspection processing unit 507 determines whether the user has changed the inspection settings via the operation unit/display unit 505. This step will be described with reference to the screen illustrated in FIG. 10A as an example. The screen illustrated in FIG. 10A is displayed on the operation unit/display unit 505 during execution of the inspection. The inspection level can be input to a text box 1001, and the delivery time can be input to a text box 1002. Since an elapsed time is displayed in a display field 1003 and the estimated completion time is displayed in a display field 1004, the user can check the progress of the job together with the inspection level. In a case where the values in the text box 1001 and the text box 1002 are changed and a button 1005 is pressed, the contents of the inspection settings are notified to the user in step S804. A layout of the screen is not limited, and the screed may be displayed as a part of a screen indicating that the inspection is in progress (not illustrated) or the screen may be displayed as a popup screen. In response to the button 1005 being pressed after any change in the inspection settings, the inspection processing unit 507 determines in step S803 that the inspection settings have been changed, and the processing proceeds to step S804.

In step S804, the inspection processing unit 507 changes the inspection level by the setting unit 509.

In the present exemplary embodiment, re-input of the job associated with the change in the inspection level can be skipped, and the same job is kept executed before and after the change of the inspection level.

In step S805, the inspection processing unit 507 performs estimation re-calculation of the completion time. The estimation re-calculation of the completion time is performed by the completion time estimation calculation process described above.

In step S806, the inspection processing unit 507 performs a binarization process on the difference image in such a manner that the value of "1" is taken if the differential value is greater than or equal to a threshold and the value of "0" is taken if the differential value is less than or equal to the threshold. In the present exemplary embodiment, the threshold is set for each inspection level as illustrated in Table 2 below.

TABLE 2

Threshold Table

| Inspection level | Threshold |
|---|---|
| 5 | 15 |
| 4 | 20 |
| 3 | 25 |
| 2 | 30 |
| 1 | 50 |

In step S807, the inspection processing unit 507 determines whether there is any pixel with the value of "1", which means that the differential value exceeds the threshold, in the image subjected to the binarization process. In a case where there is such a pixel (YES in step S807), the processing proceeds to step S808. In a case where there is no such a pixel (NO in step S807), the processing proceeds to step S809.

In step S808, the inspection processing unit 507 displays a result of the inspection process on the operation unit/display unit 505. Simply displaying a final determination result image is not user-friendly in terms of a notification notifying which type of an image defect has occurred, and thus the final determination result image is combined with the scanned image, and the generated image is displayed on the operation unit/display unit 505. The combining may be performed by any method as long as the user can easily identify the part of the image defect. For example, the part with the value of "1" in the final determination result image may be displayed in red in the scanned image.

In step S809, the inspection processing unit 507 determines the printed and inspected image has passed the inspection and increments the number of prints by "1". The relationship between the number of printed products and the number of prints to be printed may be displayed as in a display area 1006.

In step S810, the inspection processing unit 507 updates the estimated completion time. The inspection processing unit 507 updates the number of prints to be printed, the delivery time, the estimated completion time, and others in the UI screen as illustrated in FIG. 10A or 10B to notify the user of the updated information.

Figure 17A:
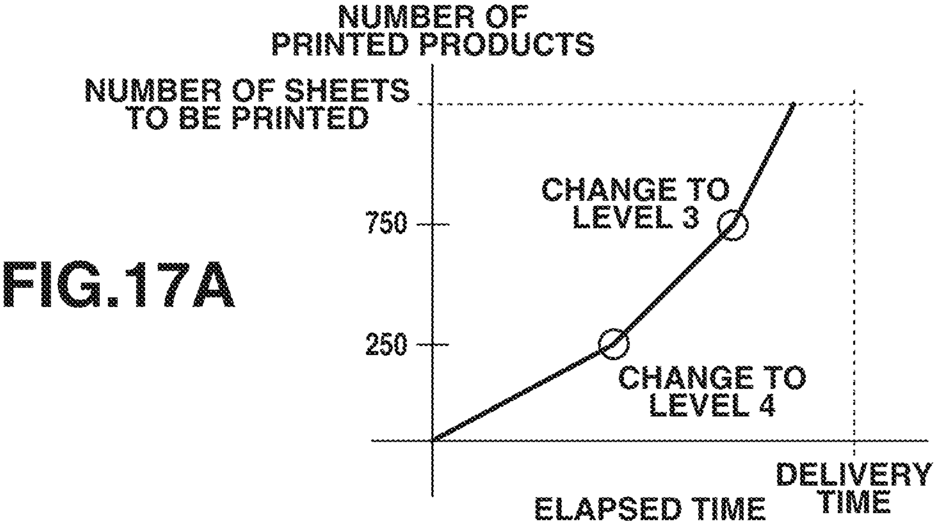
FIG. 17A is a graph illustrating a relationship between an elapsed time and the number of printed products.
Figure 17B:
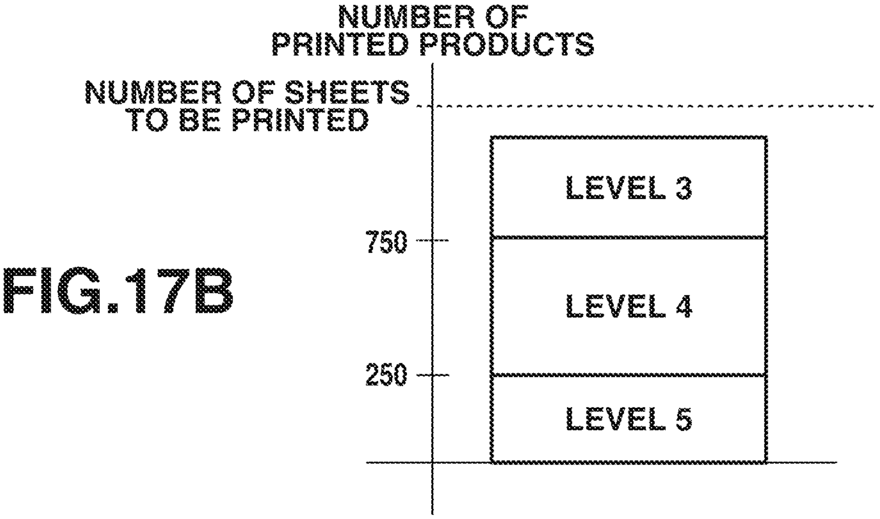
FIG. 17B is a graph illustrating a relationship between the number of printed products and inspection levels.
Figure 17C:
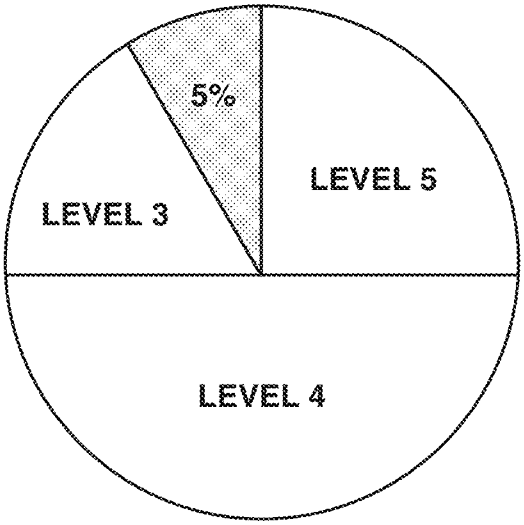
FIG. 17C is a graph illustrating the planned number of printed products and a ratio among the inspection levels.

The display item is not limited to the estimated completion time. Because the display can be in any manner as long as the user is notified of whether the inspection level is optimum, based on the lead time to the delivery time and the current progress status, graphical display as illustrated in FIGS. 17A to 17C may be displayed. The current printing status, a level change timing, the number of prints at each level, the remaining printing percentage, and others may be displayed.

Printing companies sometimes have difficulty in setting the inspection level at a start of an inspection job for the reasons described below. First, even in a case where the inspection level lower than a prescribed level has been set, the productivity is not increased. In this case, the delivery time may be delayed. As another example, even in a case where an estimated completion time has been displayed at a start of an inspection job, the productivity may be lowered more than that calculated in advance, and the delivery time may be delayed.

In a case where the inspection level is lowered, the number of prints to be passed the inspection increases, which leads to shortening of a time to be taken for production of the desired number of printed products having passed the inspection, whereby the productivity is improved. In other words, in a case where the number of prints having passed the inspection is increased with the inspection level lowered, the time to be taken for reproduction of prints for the number of prints having failed the inspection is shortened, which results in improvement in the productivity.

According to the above-described method, the user can appropriately change the inspection level during execution of the inspection, in accordance with the delivery time input by the user. Consequently, the productivity of the printed products is improved by lowering the inspection level of a currently executed job without re-input of the job to change the inspection level.

Hereinafter, image processing according to a second exemplary embodiment of the present disclosure will be described.

In the first exemplary embodiment, the description has been given of the method with which the estimation calculation of completion time is performed and the display indicating whether the delivery time is in time is performed. However, it may be troublesome for the user to change the inspection level. Automatically changing the inspection level in accordance with the delivery time allows the user to set the optimum inspection level with respect to the quality and the delivery time before start of execution of a job.

Hereinafter, only the differences from the first exemplary embodiment will be described and the redundant description will be omitted.

An outline of processing by the inspection processing unit 507 according to the present exemplary embodiment will be described with reference to FIG. 6. In step S601, the inspection processing unit 507 sets inspection parameters by a setting unit 509. In the first exemplary embodiment, an inspection level is set in accordance with the type of a defect to be detected which is represented by the inspection level. In the present exemplary embodiment, the inspection level is automatically determined and is not set to a fixed value that would remain unchanged during execution of the inspection. A method for automatically determining the inspection level will be described below. Meanwhile, an inspection level at a start of the inspection (starting inspection level) may be specified. The user can set the starting inspection level and a lower-limit and an upper-limit of the inspection level via an UI screen 1100 illustrated in FIG. 11. The level and limits can be set in text boxes 1101 to 1103, respectively, and the user inputs values to be set as necessary. Setting the lower-limit of the inspection level allows the user to keep the minimum level of quality while prioritizing the delivery time. In contrast, setting the upper-limit of the inspection level allows the user to keep productivity without excessive quality. Both the upper-limit and the lower-limit of the inspection level are not necessarily to be set, and only the lower-limit may be set.

<Completion Time Estimation Calculation Process>

Figure 12:
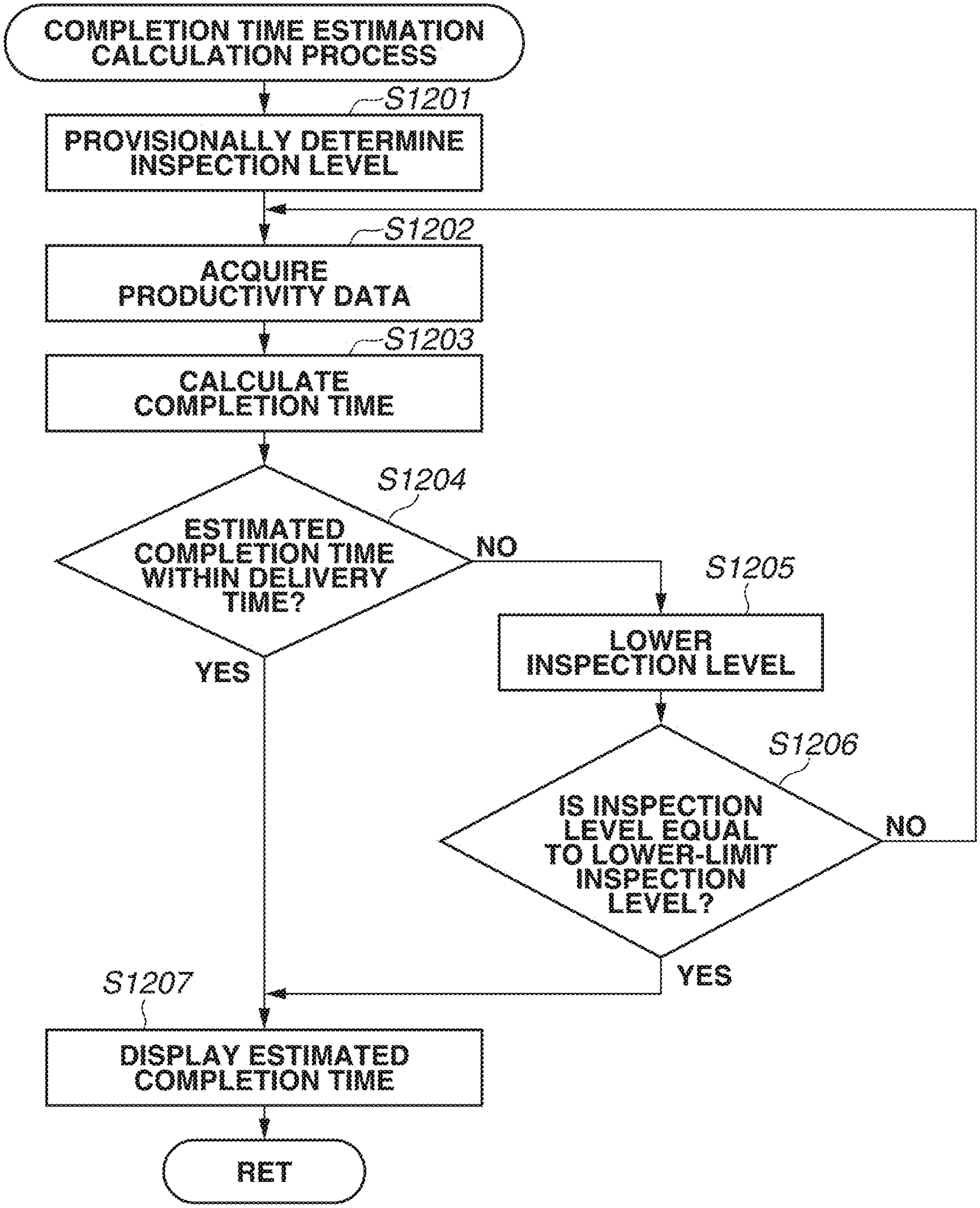
FIG. 12 is a flowchart illustrating a completion time estimation calculation process according to one or more aspects of the present disclosure.

A completion time estimation calculation process performed by the inspection processing unit 507 in step S604 will be described with reference to the flowchart illustrated in FIG. 12.

Steps S1202, S1203, and S1207 correspond to steps S702, S703, and S707, respectively.

In step S1201, the inspection processing unit 507 provisionally determines the inspection level by the setting unit 509. The inspection level provisionally determined here is a starting inspection level determined in step S601.

In a case where the starting inspection level is not input, an upper-limit inspection level is set. If the upper-limit inspection level is not set, the highest possible level in the inspection apparatus is set.

In step S1204, in a case where the inspection processing unit 507 determines that the estimated completion time is not within the delivery time (NO in step S1204), the processing proceeds to step S1205. In a case where the inspection processing unit 507 determines that the estimated completion time is within the delivery time (YES in step S1204), the processing proceeds to step S1207.

In step S1205, the inspection processing unit 507 lowers the inspection level by one.

In step S1206, the inspection processing unit 507 determines whether the inspection level coincides with the lower-limit determined in step S601. In a case where the inspection level and the lower-limit coincide with each other (YES in step S1206), the inspection processing unit 507 determines that the inspection level has reached the lower-limit, the processing proceeds to step S1207. In a case where the inspection level and the lower-limit do not coincide with each other (NO in step S1206), the processing returns to step S1202. In step S1202, the inspection processing unit 507 acquires the productivity data in the state where the inspection level is lowered by one than before, and determines again whether the estimated completion time is within the delivery time.

In the method described above, in order to prioritize the quality, the starting inspection level or the upper-limit is provisionally determined and the inspection level is lowered by one each. However, the configuration of the present exemplary embodiment is not limited to this. The lower-limit may be provisionally determined and determination of whether the estimated completion time is kept within the delivery time is performed each time when the inspection level is increased by one.

<Inspection Process>

The inspection process in step S607 illustrated in FIG. 6 will be described with reference to the flowchart illustrated in FIG. 13. Steps S1301 to S1307 correspond to steps S801 to S806.

In step S1308, the inspection processing unit 507 determines whether the updated estimated completion time is within the delivery time. In a case where the inspection processing unit 507 determines that the estimated completion time is within the delivery time (YES in step S1308), the processing proceeds to step S1311. In step S1311, the inspection processing unit 507 performs determination of whether the inspection level is set to be low with respect to the printing status. In a case where the inspection processing unit 507 determines that the estimated completion time is not within the delivery time (NO in step S1308), the processing proceeds to step S1309. In step S1309, the inspection processing unit 507 performs determination of whether the inspection level is set to be high with respect to the printing status.

In step S1309, the inspection processing unit 507 determines whether the inspection level coincides with the lower-limit. In a case where the inspection level and the lower-limit coincide with each other (YES in step S1309), the inspection processing unit 507 determines that the inspection level has been appropriately set with respect to the printing status, and the processing proceeds to step S1315. In a case where the inspection level and the lower-limit do not coincide with each other (NO in step S1309), the processing proceeds to step S1310.

In step S1310, the inspection processing unit 507 determines that the inspection level has been set to be high with respect to the printing status, and lowers the inspection level by one.

In step S1311, the inspection processing unit 507 determines whether the inspection level coincides with the upper-limit. In a case where the inspection level and the upper-limit coincide with each other (YES in step S1311), the inspection processing unit 507 determines that the inspection level has been appropriately set with respect to the printing status, and the processing proceeds to step S1315. In a case where the inspection level and the upper-limit do not coincide with each other (NO in step S1311), the processing proceeds to step S1312.

In step S1312, the inspection processing unit 507 performs the estimation calculation of the completion time at the inspection level lowered by one. The calculation process is similar to the completion time estimate calculation process described above, and thus the redundant description will be omitted.

In step S1313, the inspection processing unit 507 determines whether the estimated completion time at the inspection level increased by one is within the delivery time. In a case where the estimated completion time is within the delivery time (YES in step S1313), the inspection processing unit 507 determines that the inspection level has been set to be low with respect to the printing status. In step S1314, the inspection processing unit 507 increases the inspection level by one. In a case here the estimated completion time is not within the delivery time (NO in step S1313), the inspection processing unit 507 determines that the inspection level has been appropriately set with respect to the printing status, and the processing proceeds to step S1315.

In step S1315, the inspection processing unit 507 performs redetermination of the estimated completion time. The redetermination process of the estimated completion time is similar to the completion time estimation calculation process described above, and thus the redundant description will be omitted.

Figure 14:
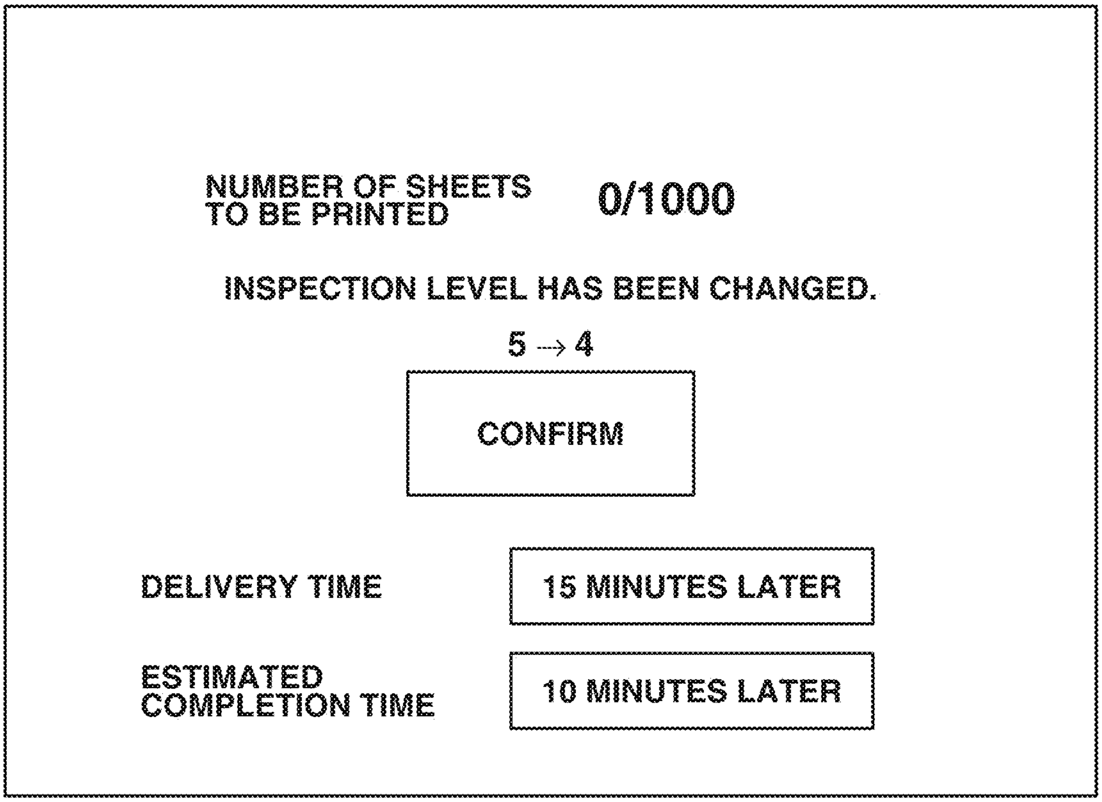
FIG. 14 is a diagram illustrating an example of a UI screen that notifies a user of a change in an inspection level according to one or more aspects of the present disclosure.

After the redetermination of the estimated completion time, in step S1316, the inspection processing unit 507 notifies the user of the change in the inspection level. The notification is displayed on the UI screen as illustrated in FIG. 14 to provide the notification to the user.

The notification method is not limited to this. Any method can be used as long as the notification is notified to the user, and thus a paper sheet as a partition sheet may be inserted at the time of paper ejection or the sheet stacking tray may be changed.

In the present exemplary embodiment, the inspection processing unit 507 performs determination of whether the inspection level is set to be low, with respect to all the prints in steps S1311 to S1314. However, the inspection method may be modified in consideration of the calculation load. For example, a threshold may be set for each inspection level, and the inspection level may be changed through comparison between a remaining time and the threshold.

In the present exemplary embodiment, the inspection processing unit 507 performs determination of whether the inspection level is set to be low, with respect to all the prints in steps S1311 to S1314. However, the inspection method may be modified in consideration of the calculation load. For example, the determination of whether the inspection level is set to be low may be skipped. In a case of prioritizing the delivery time, any process increasing the inspection level and lowering the productivity may be omitted. Any configuration can be employed as long as the inspection level is appropriately set in accordance with the user's usage.

The description has been given of the method with which the inspection level is automatically determined, to save the user's time and effort. With this method, the user can provide products having a quality as high as possible to customers even in the case of prioritizing the delivery time.

Hereinafter, image processing according to a third exemplary embodiment of the present disclosure will be described.

In the second exemplary embodiment, the inspection level is automatically determined. However, the productivity data indicates an estimate time calculated from a tendency of the past data or others, which is different from the actual process time.

Thus, in the present exemplary embodiment, a description will be given of a method for setting an actual inspection level, with which automatic setting of the inspection level in accordance with the real-time production status is achieved. Specifically, determination of whether the estimated completion time is within the delivery time, described in the second exemplary embodiment, is performed and the inspection level is changed in accordance with a current status of productivity.

In the present exemplary embodiment, the inspection level is changed in accordance with the actual printing status to achieve both the quality and the productivity.

Hereinafter, only the differences from the second exemplary embodiment will be described, and thus the redundant description will be omitted.

Figure 15:
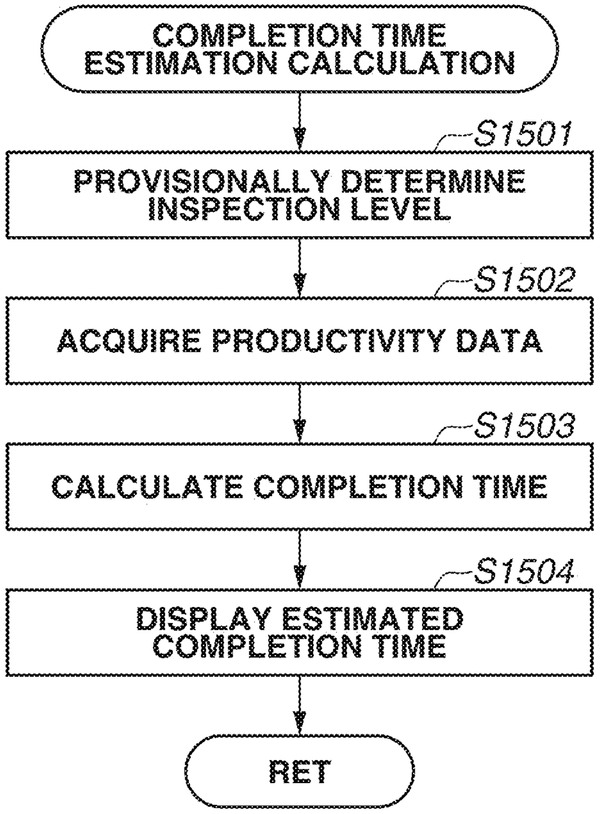
FIG. 15 is a flowchart illustrating a completion time estimation calculation process according to one or more aspects of the present disclosure.

The completion time estimation calculation process by the inspection processing unit 507 in step S604 illustrated in FIG. 6 will be described with reference to the flowchart illustrated in FIG. 15.

Steps S1502 to S1504 are similar to steps S1202, S1203, and S1207.

Figure 11:
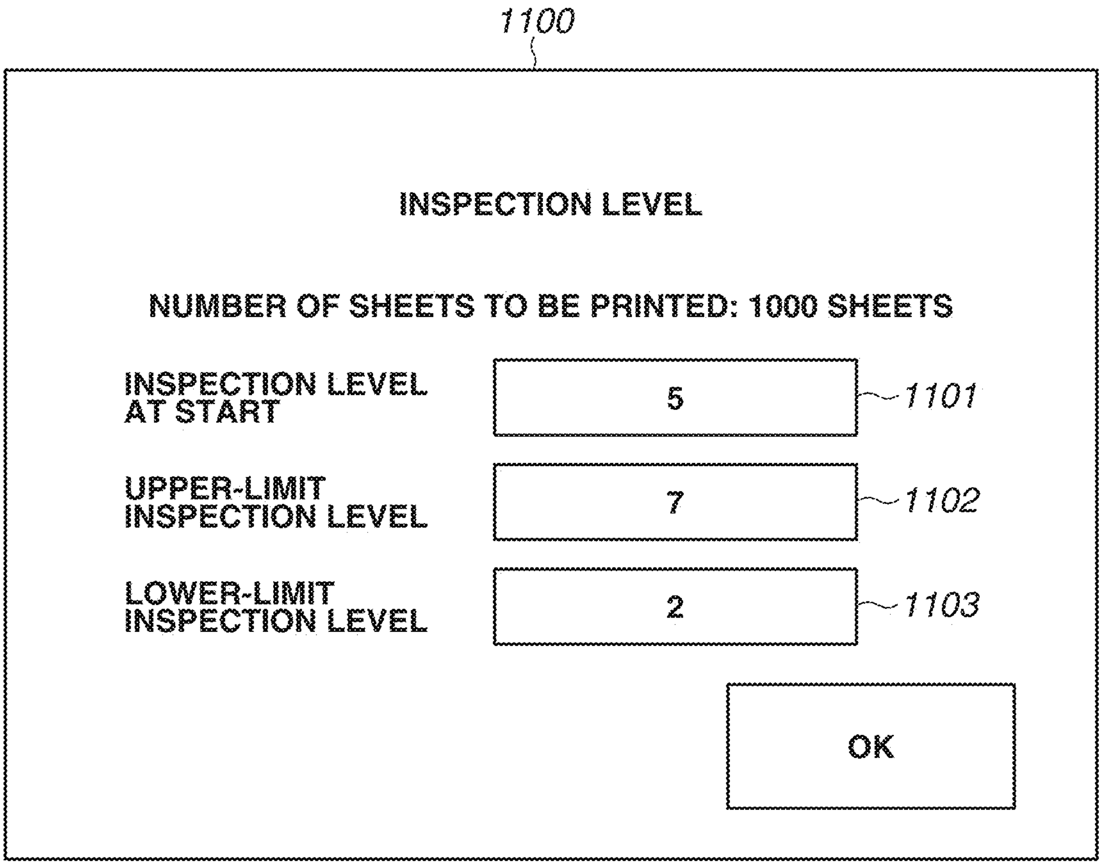
FIG. 11 is a diagram illustrating an example of a setting screen of an inspection level range according to one or more aspects of the present disclosure.

In step S1501, the inspection processing unit 507 provisionally determines the inspection level by the setting unit 509. The starting inspection level input by the user to the text box 1101 illustrated in FIG. 11 is used. In a case where the inspection level is not input, a default value may be used.

Figure 16:
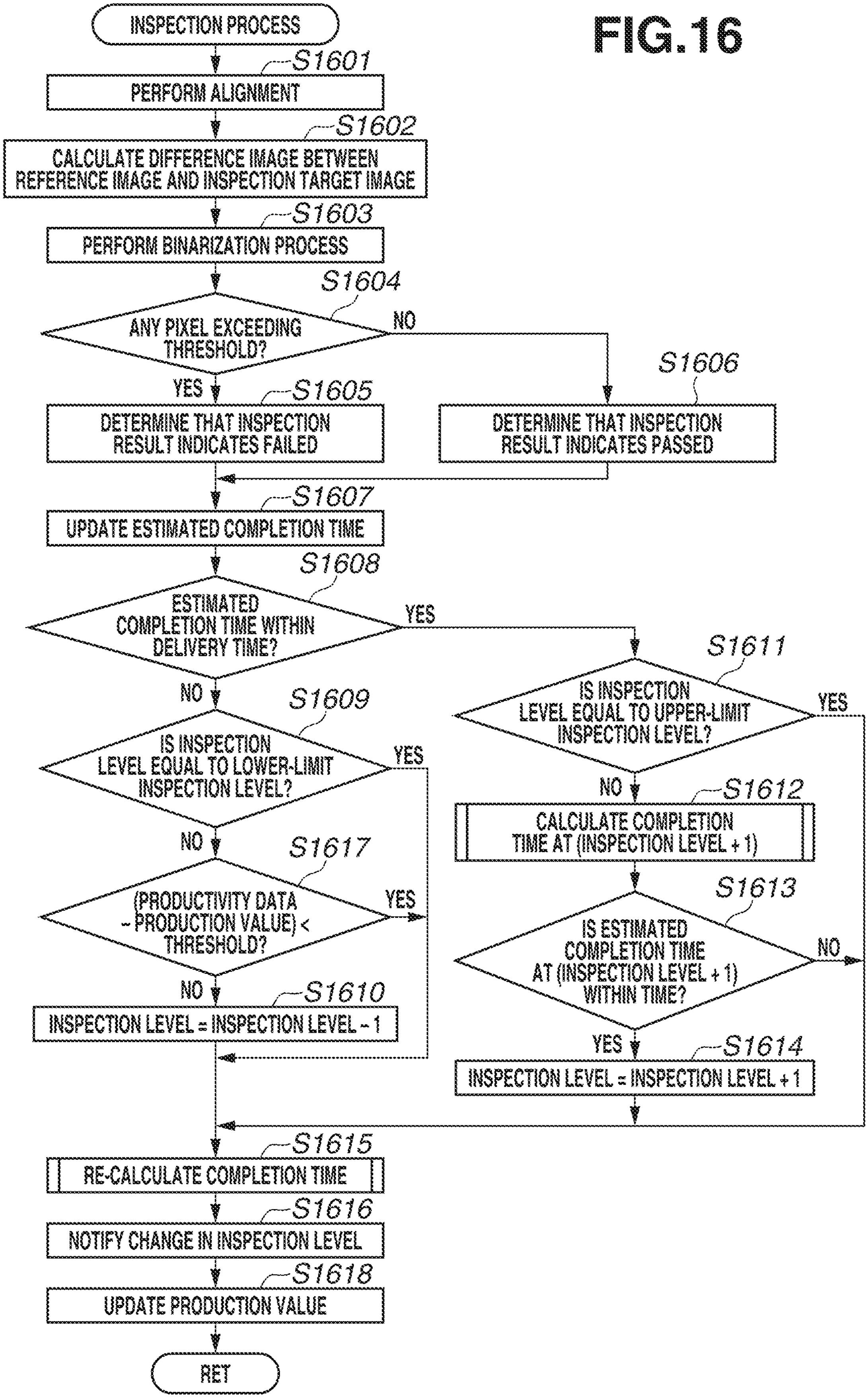
FIG. 16 is a flowchart illustrating an inspection process according to one or more aspects of the present disclosure.

The inspection process that is performed by the inspection processing unit 507 in step S607 will be described with reference to the flowchart illustrated in FIG. 16.

Steps S1601 to S1616 are similar to steps S1301 to S1316, and thus the redundant description will be omitted.

In step S1617, the inspection processing unit 507 performs determination of whether a value obtained by subtracting a current production value (pages/min) from the productivity data is more than a threshold. The current production value (pages/min) is calculated by dividing the number of printed products by the elapsed time. In the present exemplary embodiment, the threshold is used to determine how much the production is behind with respect to estimated productivity data and to determine whether the productivity is to be increased to make up for the delay. Even in a case where the inspection processing unit 507 has determined in step S1608 that the estimated completion time is not within the delivery time, in a case where the inspection processing unit 507 determines in step S1617 that the value does not exceed the threshold, the inspection processing unit 507 determines that the delay can be made up for with the current productivity.

In step S1618, the inspection processing unit 507 updates the current production value (pages/min). The inspection processing unit 507 counts the elapsed time and the number of printed products having passed the inspection in step S1606, and calculates the current production value by using the count values.

With the above-described configuration, the inspection level is changed in accordance with the actual printing status, and both the quality and the productivity are achieved.

Other Exemplary Embodiments

Although various examples and exemplary embodiments of the present disclosure have been described, the spirit and scope of the present disclosure are not limited to the specific descriptions in the present specification.

The present disclosure can also be realized by processing in which a program for realizing one or more functions of the above-described exemplary embodiments is supplied to a system or an apparatus via a network or a storage medium, and one or more processors in a computer of the system or the apparatus read and execute the program. The present disclosure can also be realized by a circuit (for example, an ASIC) that realizes one or more functions.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-088409, filed May 30, 2023, which is hereby incorporated by reference herein in its entirety.

What is claimed is:

1. An inspection apparatus comprising:
a controller having one or more processors which executes instructions stored in one or more memories, the controller being configured to:
receive an inspection level that is used in an inspection process of images that have been read by a reading apparatus from images formed on sheets conveyed consecutively from an image formation apparatus by execution of a job; and
execute the inspection process,
wherein the controller is capable of receiving a change in the inspection level during execution of the job, and in a case where the change in the inspection level is received, the controller performs the inspection process of images formed by the job at the inspection level changed after receipt of the change and updates a completion time of the job in execution calculated at least based on the changed inspection level.

2. The inspection apparatus according to claim 1, wherein the inspection apparatus has a display and displays a completion time of a job in execution calculated at least based on an inspection level set by the controller.

3. The inspection apparatus according to claim 2, wherein in a case where the inspection level is changed from a first inspection level to a second inspection level during execution of the job, a completion time of the job in execution calculated at least based on the first inspection level and displayed on the display is updated to a completion time of the job in execution calculated at least based on the second inspection level.

4. The inspection apparatus according to claim 2, wherein in a case where a completion time of the job in execution calculated at least based on the inspection level exceeds an estimated completion time of the job in execution received in advance, a warning is displayed on the display.

5. The inspection apparatus according to claim 2, wherein the completion time of the job in execution displayed on the display includes one or both of a time to be taken for execution of the job and a time at which the job is to be completed.

6. The inspection apparatus according to claim 2, wherein the completion time of the job in execution displayed on the display is represented in a graphical form.

7. The inspection apparatus according to claim 1, wherein the inspection process that is performed at the inspection level set before receipt of the change, and the inspection process that is performed at the inspection level set after receipt of the change are inspections that are performed on images formed by an image formation unit by execution of a same job.

8. A control method of an inspection apparatus, comprising:

receiving an inspection level that is used in an inspection process of images consecutively conveyed from an image formation apparatus by execution of a job; and performing the inspection process in response to acquisition of the images that have been read by a reading apparatus from images on sheets formed by the image formation apparatus, wherein a change in the inspection level is received in the receiving even during execution of the job and updates a completion time of the job in execution calculated at least based on the changed inspection level.

9. An inspection system including a printing apparatus for printing an image on a print medium to produce a printed product, a reading apparatus for reading the printed product to generate image data, and an inspection apparatus configured to inspect the printed product based on the image data, the inspection system comprising:

a reception interface (IF) configured to receive an inspection level for use in an inspection process in which the printing apparatus generates the printed product by executing a job, the reading apparatus generates the image data based on the printed product, and the inspection apparatus inspects the printed product based on the image data; and an inspection unit configured to perform the inspection process of the printed product based on the image data at the inspection level, wherein the reception IF is capable of receiving a change in the inspection level during execution of the job, and in a case where the change in the inspection level has been received by the reception IF, the inspection unit performs the inspection process of the printed product formed by the job, based on the image data at the inspection level set after receipt of the change and the inspection system updates a completion time of the job in execution calculated at least based on the inspection level set after receipt of the change.

10. The inspection system according to claim 9, further comprising a display, wherein the display displays a completion time of the job in execution calculated at least based on the inspection level received by the reception IF.

11. The inspection system according to claim 10, wherein in a case where the inspection level is changed from a first inspection level to a second inspection level during execution of the job, a completion time of the job in execution calculated at least based on the first inspection level and displayed on the display is updated to a completion time of the job in execution calculated at least based on the second inspection level.

12. The inspection system according to claim 10, wherein in a case where a completion time of the job in execution calculated at least based on the inspection level exceeds an estimated completion time of the job in execution received in advance, a warning is displayed on the display.

13. The inspection system according to claim 10, wherein the completion time of the job in execution displayed on the display includes one or both of a time to be taken for execution of the job and a time at which the job is to be completed.

14. The inspection system according to claim 10, wherein the completion time of the job in execution displayed on the display is represented in a graphical form.

15. The inspection system according to claim 9, wherein the inspection process that is performed at the inspection level set before receipt of the change, and the inspection process that is performed at the inspection level set after receipt of the change are inspections that are performed on images formed by the printing apparatus by execution of a same job.

* * * * *